(12) United States Patent
Ferry

(10) Patent No.: US 12,344,051 B2
(45) Date of Patent: Jul. 1, 2025

(54) SENSOR ASSEMBLIES AND SYSTEMS FOR MONITORING A DYNAMIC OBJECT

(71) Applicant: Keith George Ferry, Burbank, CA (US)

(72) Inventor: Keith George Ferry, Burbank, CA (US)

(73) Assignee: Cerebrum Sensor Technologies, Inc., Van Nuys, CA (US)

( * ) Notice: Subject to any disclaimer, the term of this patent is extended or adjusted under 35 U.S.C. 154(b) by 395 days.

(21) Appl. No.: 16/671,105

(22) Filed: Oct. 31, 2019

(65) Prior Publication Data

US 2021/0129601 A1    May 6, 2021

(51) Int. Cl.
*B60C 23/04*    (2006.01)
*B29D 30/00*    (2006.01)
(Continued)

(52) U.S. Cl.
CPC ...... *B60C 23/0493* (2013.01); *B29D 30/0061* (2013.01); *G01K 1/14* (2013.01);
(Continued)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS

| | | |
|---|---|---|
| 4,862,486 A | 8/1989 | Wing et al. |
| 5,181,975 A | 1/1993 | Pollack et al. |

(Continued)

FOREIGN PATENT DOCUMENTS

| | | |
|---|---|---|
| CN | 1976821 A | 6/2007 |
| CN | 109641492 A | 4/2019 |

(Continued)

OTHER PUBLICATIONS

International Search Report dated Feb. 2, 2021 for corresponding International Application No. PCT/US2020/058402 filed Oct. 30, 2020; total 2 pages.
Written Opinion of the International Searching Authority dated Feb. 2, 2021 for corresponding International Application No. PCT/US2020/058402 filed Oct. 30, 2020; total 13 pages.
(Continued)

*Primary Examiner* — Andre J Allen
(74) *Attorney, Agent, or Firm* — Snell & Wilmer L.L.P.

(57) ABSTRACT

Sensor assemblies and systems comprise a housing configured to accommodate an electrical sensor device therein, mechanically retain the same, and provide a protective surrounding thereto. The housing may include display indicia relating to some aspect of the sensor assembly. The electrical sensor device include electrical components useful for the purpose of monitoring and transmitting desired data relating to operating parameters/conditions of the dynamic article that the sensor assembly is attached with, e.g., a vehicle tire. The data is transmitted wirelessly from the electrical sensor device. The housing is removably attached with a retaining member that is also attached with the dynamic article. A receiver external from the dynamic article receives the data for the purpose of determine such operating parameter/or conditions, when the dynamic article is a vehicle tire, as tire tread depth, tire pressure, vehicle camber and toe alignment variations, and tire/vehicle location, which may be stored.

56 Claims, 8 Drawing Sheets

(51) Int. Cl.
*G01K 1/14* (2021.01)
*G01L 19/14* (2006.01)
*G01P 1/02* (2006.01)
*G01S 19/14* (2010.01)

(52) U.S. Cl.
CPC ............ *G01L 19/147* (2013.01); *G01P 1/023* (2013.01); *G01S 19/14* (2013.01); *B29D 2030/0083* (2013.01)

(58) Field of Classification Search
CPC . B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; B29D 30/0061; B29D 2030/0072; B29D 2030/0083; G01L 17/00; G01L 19/147; G01L 19/148; G01K 1/14; G01P 1/023

See application file for complete search history.

(56) References Cited

U.S. PATENT DOCUMENTS

| | | |
|---|---|---|
| 5,500,065 A | 3/1996 | Koch et al. |
| 5,562,787 A | 10/1996 | Koch et al. |
| 5,573,610 A | 11/1996 | Koch et al. |
| 5,573,611 A | 11/1996 | Koch et al. |
| 5,731,754 A | 3/1998 | Lee, Jr. et al. |
| 5,971,046 A | 10/1999 | Koch et al. |
| 6,030,478 A | 2/2000 | Koch et al. |
| 6,208,244 B1 | 3/2001 | Wilson et al. |
| 6,217,683 B1 | 4/2001 | Balzer et al. |
| 6,255,940 B1 | 7/2001 | Phelan et al. |
| 6,257,289 B1 | 7/2001 | Tomita et al. |
| 6,309,494 B1 | 10/2001 | Koch et al. |
| 6,688,353 B1 | 2/2004 | Koch |
| 6,769,319 B2 | 8/2004 | McDonald et al. |
| 6,788,192 B2 | 9/2004 | Shimura |
| 7,009,506 B2 | 3/2006 | Wilson et al. |
| 7,693,626 B2 | 4/2010 | Breed et al. |
| 7,770,444 B2 | 8/2010 | Bertrand |
| 7,900,665 B2 | 3/2011 | Shimura |
| 8,248,225 B2 | 8/2012 | Buck et al. |
| 8,657,975 B2 | 2/2014 | Bell |
| 8,776,590 B2 | 7/2014 | Kempf et al. |
| 8,874,386 B2 | 10/2014 | Brusarosco et al. |
| 9,950,575 B2 | 4/2018 | Marques et al. |
| 10,119,876 B2 | 11/2018 | Marques et al. |
| 10,712,238 B2 | 7/2020 | Ledoux et al. |
| 2002/0029626 A1 | 3/2002 | Koch et al. |
| 2003/0221766 A1 | 12/2003 | Strache et al. |
| 2010/0256874 A1 | 10/2010 | Carresjo et al. |
| 2011/0025487 A1 | 2/2011 | Laird et al. |
| 2013/0167999 A1 | 7/2013 | Nakatani et al. |
| 2016/0332493 A1 | 11/2016 | Atsumi et al. |
| 2017/0001480 A1 | 1/2017 | Ferry et al. |
| 2017/0232806 A1 | 8/2017 | Sakamoto et al. |

(56) References Cited

U.S. PATENT DOCUMENTS

| | | | |
|---|---|---|---|
| 2018/0186200 A1 | 7/2018 | Brusarosco et al. | |
| 2019/0160895 A1 | 5/2019 | So et al. | |
| 2019/0184773 A1 | 6/2019 | Saito | |
| 2019/0187027 A1 | 6/2019 | Lin et al. | |
| 2019/0322143 A1 | 10/2019 | Sabatini et al. | |
| 2021/0181063 A1 | 6/2021 | Dodani et al. | |
| 2021/0370726 A1* | 12/2021 | Dodani | B60C 23/0493 |
| 2021/0370727 A1 | 12/2021 | Yamaguchi | |
| 2021/0394566 A1 | 12/2021 | Yamaguchi | |

FOREIGN PATENT DOCUMENTS

| | | |
|---|---|---|
| JP | 2004330842 A | 11/2004 |
| JP | 2005240039 A | 9/2005 |
| JP | 2006234481 A | 9/2006 |
| JP | 2008062730 A | 3/2008 |
| JP | 2012187941 A | 10/2012 |
| JP | 2018016278 A | 2/2018 |
| RU | 2143345 C1 | 12/1999 |
| WO | 2019123118 A1 | 6/2019 |
| WO | 2020036859 A1 | 2/2020 |

OTHER PUBLICATIONS

International Preliminary Report on Patentability dated May 3, 2022 in corresponding International Application No. PCT/US2020/058402 filed Oct. 30, 2020; total 14 pages.

Non-Final Office Action dated Nov. 23, 2022 in corresponding U.S. Appl. No. 17/084,483, filed Oct. 29, 2020; total 32 pages.

Notice of Allowance dated Jul. 27, 2023 in corresponding U.S. Appl. No. 17/084,483, filed Oct. 29, 2020; total 13 pages.

Corrected Notice of Allowability dated Sep. 6, 2023 in corresponding U.S. Appl. No. 17/084,483, filed Oct. 29, 2020; total 2 pages.

European Search Report dated Jan. 26, 2024 in corresponding European Application No. 20882238.7 filed Oct. 30, 2020; total 9 pages.

"Patch Rubber Company—Truck Tire Repair Procedures—Two Piece." YouTube, uploaded by PatchRubberCompany, Mar. 3, 2011, https://www.youtube.com/watch?v=Ot1elhj3OVE; total 4 pages, not including cover sheet.

"VDO REDI-Sensor". Installation Manual, 2016 Continental Aftermarket Gmbh, https://www.vdo.com/media/182596/tu00-0780-6107100-manual-d-151221-en.pdf; total 30 pages.

"VDO REDI-Sensor | Multi-Application TPMS Sensor Installation." YouTube, uploaded by VDO Fleet International, Nov. 18, 2016, https://www.youtube.com/watch?v=VXrC8g3auVI. (cited as alleged prior art in Defendant's Initial Invalidity Contentions served on Nov. 27, 2024 in the litigation Cerebrum Sensor Technologies, Inc. et al. v. Revvo Technologies, Inc., Case No. 1:24-cv-00245-JLH-SRF (D. Del.)).

VDO REDI-Sensor Valveless "VL". Montageanleitung Installation Manual, Nov. 18, 2016, Continental Aftermarket GmbH, https://www.vdo.de/redi-montage/, total 52 pages. (cited as alleged prior art in Defendant's Initial Invalidity Contentions served on Nov. 27, 2024 in the litigation Cerebrum Sensor Technologies, Inc et al. v. Revvo Technologies, Inc., Case No. 1:24-cv-00245-JLH-SRF (D. Del.)).

"VDO REDI-Sensor—Installation Manual." The Manual is applicable to: VDO REDI-Sensor Valveless "VL", 2014, Continental Aftermarket GmbH, https://media.motoral.ee/productfiles/999029350/manual/WDO_REDI_SENSORI_PAIGALDUSJUHEND.pdf; total 26 pages. (cited as alleged prior art in Defendant's Initial Invalidity Contentions served on Nov. 27, 2024 in the litigation Cerebrum Sensor Technologies, Inc et al. v. Revvo Technologies, Inc., Case No. 1:24-cv-00245-JLH-SRF (D. Del.)).

"VDO REDI-Sensor." Installation Manual, 2016, Continental Aftermarket Gmbh, https://www.vdo.com/media/182596/tu00-0780-6107100-manual-d-151221-en.pdf; total 30 pages. (cited as alleged prior art in Defendant's Initial Invalidity Contentions served on Nov. 27, 2024 in the litigation Cerebrum Sensor Technologies, Inc et al. v. Revvo Technologies, Inc., Case No. 1:24-cv-00245-JLH-SRF (D. Del.)).

"Roundtable Reifen Technik." Continental. The Future in Motion. Roundtable Handout, Mar. 20, 2014 Continental Aftermarket Gmbh, https://www.rema-tiptop.de/fileadmin/data/common/downloads/roundtable/2014/2014-03-20_Continental_Roundtable_Handout_FINAL.pdf; total 20 pages. (cited as alleged prior art in Defendant's Initial Invalidity Contentions served on Nov. 27, 2024 in the litigation Cerebrum Sensor Technologies, Inc et al. v. Revvo Technologies, Inc., Case No. 1:24-cv-00245-JLH-SRF (D. Del.)).

"VDO REDI-Sensor successfully launched on the market." Continental. The Further in Motion, Sep. 16, 2014, https://www.continental.com/en/press/press-releases/2014-09-16-vdo-redi-sensor/; total 3 pages. (cited as alleged prior art in Defendant's Initial Invalidity Contentions served on Nov. 27, 2024 in the litigation Cerebrum Sensor Technologies, Inc et al. v. Revvo Technologies, Inc., Case No. 1:24-cv-00245-JLH-SRF (D. Del.)).

"Track Connect: connected tire solutions | Michelin." YouTube, uploaded by Michelin, Mar. 26, 2018, https://www.youtube.com/watch?v=Cili2VJ7OXs. (cited as alleged prior art in Defendant's Initial Invalidity Contentions served on Nov. 27, 2024 in the litigation Cerebrum Sensor Technologies, Inc et al. v. Revvo Technologies, Inc., Case No. 1:24-cv-00245-JLH-SRF (D. Del.)).

"MICHELIN—Track Connect—Full Version." YouTube, uploaded by Michelin Canada, Jul. 25, 2019, https://www.youtube.com/watch?v=arw108KcBCY. (cited as alleged prior art in Defendant's Initial Invalidity Contentions served on Nov. 27, 2024 in the litigation Cerebrum Sensor Technologies, Inc et al. v. Revvo Technologies, Inc., Case No. 1:24-cv-00245-JLH-SRF (D. Del.)).

"Track Connect: first connected coaching system | MICHELIN." YouTube, uploaded by Michelin, Jun. 24, 2019, https://www.youtube.com/watch?v=ZrkpQX3mGI8. (cited as alleged prior art in Defendant's Initial Invalidity Contentions served on Nov. 27, 2024 in the litigation Cerebrum Sensor Technologies, Inc et al. v. Revvo Technologies, Inc., Case No. 1:24-cv-00245-JLH-SRF (D. Del.)).

"Michelin—Track Connect." YouTube, uploaded by Michelin Canada, Jul. 25, 2019, https://www.youtube.com/watch?v=JHxZsOhHkjI. (cited as alleged prior art in Defendant's Initial Invalidity Contentions served on Nov. 27, 2024 in the litigation Cerebrum Sensor Technologies, Inc et al. v. Revvo Technologies, Inc., Case No. 1:24-cv-00245- JLH-SRF (D. Del.)).

"Michelin courting performance customers with "Track Connect" tool." https://www.tirebusiness.com/news/michelin-courting-performance-customers-track-connect-tool. (cited as alleged prior art in Defendant's Initial Invalidity Contentions served on Nov. 27, 2024 in the litigation Cerebrum Sensor Technologies, Inc et al. v. Revvo Technologies, Inc., Case No. 1:24-cv-00245-JLH-SRF (D. Del.)).

"Michelin Track Connect User Manual." Version 04022019. Michelin France, https://fcc.report/FCC-ID/FI5-EX2-01/4287115.pdf; total 41 pages. (cited as alleged prior art in Defendant's Initial Invalidity Contentions served on Nov. 27, 2024 in the litigation Cerebrum Sensor Technologies, Inc et al. v. Revvo Technologies, Inc., Case No. 1:24-cv-00245-JLH-SRF (D. Del.)).

"Michelin at the 2019 Geneva International Motor Show." 2019, https://dgaddcosprod.blob.core.windows.net/corporate-production/attachments/clktclei106at2fhhhpap25yr-pk-gims-19-salon-geneve-GB.pdf; total 20 pages. (cited as alleged prior art in Defendant's Initial Invalidity Contentions served on Nov. 27, 2024 in the litigation Cerebrum Sensor Technologies, Inc et al. v. Revvo Technologies, Inc., Case No. 1:24-cv-00245-JLH-SRF (D. Del.)).

"TWB #25 | TPMS Sensor Mini Teardown." YouTube, uploaded by That Electronics Fool, Apirl 6, 2015, https://www. youtube.com/watch?v=JQhK8WqRZ2g. (cited as alleged prior art in Defendant's Initial Invalidity Contentions served on Nov. 27, 2024 in the litigation Cerebrum Sensor Technologies, Inc et al. v. Revvo Technologies, Inc., Case No. 1:24-cv-00245-JLH-SRF (D. Del.)).

Petition for Inter Partes Review of U.S. Pat. No. 11,835,421 (IPR No. 2025-00632) dated Feb. 21, 2025. The IPR Petition challenges a patent that is related as a child continuation-in-part to the present pending parent patent application; total 97 pages.

(56) References Cited

OTHER PUBLICATIONS

Non-Final Office Action dated May 9, 2025 in corresponding U.S. Appl. No. 18/528,624 filed Dec. 4, 2023; total 18 pages.

* cited by examiner

SENSOR ASSEMBLIES AND SYSTEMS FOR MONITORING A DYNAMIC OBJECT

FIELD

Sensor assemblies and systems as disclosed herein are configured for use in measuring, monitoring and/or determining one or more feature and/or operating parameter associated with a dynamic object and, more specifically, are configured for use in measuring, monitoring and/or determining a feature, operating parameter, condition, and/or performance aspect of a vulcanized rubber object or article such as a vehicle tire.

BACKGROUND

It is known that the overall performance and safety of vehicles such as automobiles is highly correlated with tire condition. Since the mid-20th century, tires have moved from a 'basic necessity' often overlooked, to one of the most important components of a vehicle's safety and performance on the road.

Several institutions including the National Highway Traffic Safety Administration (NHTSA), Department of Transportation (DOT), and Society of Automotive Engineers (SAE) have all linked over thousands of accidents, hundreds of deaths, and countless injuries directly with tire condition. These incidents have been determined to source from multiple causes including blowouts, tread separations, and pressure abnormalities. Despite vehicle and tire manufacturer and regulatory institution recommendations, most consumers rarely have the know-how or discipline to perform routine necessary tire maintenance. And, even still, many symptoms of a possible tire failure are undetectable through basic tire maintenance. The introduction of 'run flat' tires (which can operate properly for a period of time despite a low pressure condition) has further exacerbated the issue of failure detectability since many drivers are completely unaware of the tire condition. Thus, the importance of a tire monitoring system to initiate proper tire maintenance for safety became significant.

In addition to the importance of tire condition as it relates to safety, research also proves the economics of fuel economy and tire durability as associated with tire pressure, temperature, etc. Experts in the field have found that the underinflation of tires can reduce fuel economy by 1-3% per psi below the manufacturers' recommended tire inflation level. In addition, over the course of the tire service lifetime, underinflation of 10% can result in premature tire wear of over 15%. Between the cost associated with additional fuel and increased new tire purchase frequency (not to mention the cost associated with vehicle downtime and the cost of maintenance), it is well proven that basic tire awareness and maintenance techniques can save hundreds to thousands of dollars annually for the average consumer. With fleet vehicles that travel hundreds of thousands of miles annually, these savings are exponentially higher. However, despite the economic benefits associated with basic tire awareness and maintenance, the increased costs noted above hit nearly every consumer and businesses due to real-time data limitations and the effort necessary to efficiently monitor tire and maintain inflation pressure conformity with the manufacturer recommendations.

The 21st century has marked the start of a new era for the advancement of automotive vehicles with the integration of advanced technological systems known as vehicle telematics. This technology has proven useful for related industries such as insurance, which can monitor vehicle behavior (particularly surrounding an event such as a crash) for usage-based-insurance rate adjustments. Systems like rear camera detection, lane departure and blind spot notifications, and adaptive cruise control (to name a few) are driving improvements for safety, fuel efficiency and performance and leading towards the feasibility of autonomous vehicles. Whereas drivers have historically relied on subjective handling and steering feedback, an autonomous vehicle depends entirely on feedback through sensors to perform and react. Yet, while vehicle technology continues to advance and adapt quickly in support of autonomous vehicles, it is the tires that have shown the least progression. Without the real-time feedback of tire conditions such as tire pressure, temperature, slip, strain, load, tread wear, etc., autonomous vehicles will have never achieved optimum performance and safety.

Recognizing these limitations and the importance of tire monitoring as it relates to the aforementioned factors, the automotive industry and regulatory entities have introduced waves of products and regulations associated with vehicle tires with the goal of improving vehicle safety and performance and supporting autonomous vehicle technology. One major advancement in tire technology has been the solution to continuously monitor tire inflation pressure and in some cases temperatures.

Currently there are two mainstream methods for automatically detecting tire inflation pressure; namely, an indirect method and a direct method. The indirect method is generally based on monitoring the number of tire rotations over a period of time utilizing an anti-lock braking system (ABS) of the vehicle and determining tire pressure variations. Though effective as a general indication of tire pressure variations, this method is not able to detect immediate and significant tire pressure loss conditions or provide specific data as it relates to each tire pressure condition. The direct detection method seeks to resolve these limitations utilizing microelectromechanical (MEMS) pressure sensors mounted in the wheel of each tire which communicates with the vehicle's primary on-board engine computer or control unit (ECU) and/or other receiver devices such as a mobile phone. This direct detection method has gained widespread popularity, and in 2007 the U.S. government mandated the use of direct tire-pressure monitoring system (TPMS) technology in nearly all motor vehicles. This mandate has since been adopted by several other countries and continents and thousands of tire monitoring products have since been developed.

Over the past decade or so, three main types of direct TPMS sensors have emerged from technology leaders in the automotive industry. The first type is a clamp-on-rim sensor which mounts directly to the well bed of the wheel utilizing a clamp. The second and most commonly chosen type for OE applications, is the valve-stem-attached sensor which affixes within the tire and wheel assembly on the base of a valve stem. These two types typically require installation by an industry professional with technical training as well as access to TPMS tools for activating and programming the sensors to properly communicate with the vehicle ECU. The third type which is common in aftermarket and used for do-it-yourself applications is the valve-cap-attached sensor which replaces the valve stem cap and does not typically require special tooling. However, this third type generally communicates via BLE with a receiver such as a mobile phone or similar to display to the driver as opposed to the vehicle ECU. This valve-cap-attached sensor has proven useful for vehicles manufactured prior to the government TPMS mandate which are not equipped with TPMS to ECU communication or displays.

Despite this progress in tire monitoring technology, nearly all TPMS sensors available today remain inadequate when it comes to complete tire condition monitoring. Tire (and vehicle) safety and performance is a consideration of multiple factors including but not limited to pressure, temperature, condition, load and alignment. As it stands today, the majority of vehicles equipped with TPMS technology only communicate single tire parameter; pressure. Further limiting, most vehicle manufacturers' TPMS displays used to alert drivers of a tire pressure concern do not indicate which tire is experiencing an issue and even fewer display what the issue is (whether pressure variation or simply a sensor communication issue) or how severe of a concern the alert is (slow leak, major pressure loss, etc.).

Considering further the extremely limited, advanced automotive manufacturer and aftermarket tire sensor displays which provide this level of detail, a second parameter tire temperature is rarely available and in nearly all cases an irrelevant output. By the nature of TPMS design which is affixed to the wheel, valve stem or valve cap, the temperature which is monitored by these sensors is actually tire air temperature as opposed to the tire rubber temperature itself. This misleading given the variation (in excess at times of 30 degrees Fahrenheit) that exists between tire rubber and tire air temperature, rendering this sensor output as useless particularly for motorsports applications where real-time tire temperature monitoring is pivotal.

Given the evident shortcomings of traditional TPMS solutions, a limited few companies have developed electronic units which affix directly to the vehicle tires as opposed to the wheel, valve stem or valve cap. These solutions are placed within a flexible "housing" affixed to the inner tire surface typically opposite of the tire tread surface. Further still, it has been found that these advanced TPMS solutions remain impractical or inadequate either by:
1. Excessive sizing and weight causing tire performance and sensor durability issues;
2. Difficulty of affixing to all tire inner surfaces, often solely through the vulcanization of the "housing" to the tire during the green tire process;
3. Limited application of the technology to specific tire manufacturers or tire models manufactured with the technology;
4. Limited functionality and reporting of total tire performance parameters such as temperature, treadwear, alignment, load, etc.;
5. Lack of diversity of communication protocols further limiting the availability to specific vehicles; and
6. Requirement of significant investment for tooling to configure and output sensor information.

SUMMARY

Sensor assemblies and systems as disclosed herein are configured for use with a dynamic object for purposes of monitoring one or more parameter of the object. In an example, the dynamic object is in the form of a vulcanized rubber article. In an example, the sensor assembly is configured for attachment with the vulcanized rubber article. The sensor assembly may comprise a housing having an outer surface and an internal cavity that is enclosed within the housing. In an example, the housing comprises a top cover, a wall structure, and a base section that define the internal cavity. The top cover, wall structure and base section may be formed from the same or different materials, and one or more of the top cover, wall section, and base section may separate or integral with one another.

An electrical sensor device may be disposed within the housing internal cavity and attached therein to prevent movement of the electrical sensor device within the cavity. In an example, the one of the top cover or base section is removably attached with the wall structure to facilitate installation and/or removal of the electrical sensor device from the internal cavity. In an example, the electrical sensor device is mechanically attached within the internal cavity by one or more surface features within the internal cavity that contact the electrical sensor device to retain its position therein, and wherein an open space exists above and below the electrical sensor device within the internal cavity. In an example, the electrical sensor device may be encapsulated by the inner cavity of the housing during a process of making the housing that operates to retain the position of the electrical sensor device within the housing. In an example, the housing includes an opening through the outside surface to the internal cavity, and further includes a filter that is positioned to filter air passing into the internal cavity before reaching the electrical sensor device.

The electrical sensor device is configured to sense, transmit and/or receive information regarding surrounding conditions, orientation and/or location when the sensor assembly is attached with a dynamic object such as a vulcanized rubber article. In an example, sensor element is configured to sense one or more variables selected from the group consisting of air pressure, temperature, acceleration, or orientation or location of the environment, sensor assembly, of the vulcanized rubber article. In an example, the electrical sensor device comprises a printed circuit board having electrical circuitry, a portable power source for providing power to the electrical sensor device, at least one sensor element, a storage element, and an antenna for receiving and/or transmitting information from the electrical sensor device.

In an example, the electrical sensor device is configured to communicate wirelessly with one or more receivers or transmitters that are external from the rubber article to thereby provide a sensing system as disclosed herein. In an example, sensing system receivers have one or more antennas and are capable of wirelessly communicating to and from the electrical sensor device, e.g., with the printed circuit board or component attached therewith of the electrical sensor device. In an example, the electrical sensor device may include more than one antennas that are capable of transmitting and/or receiving wireless communication via Bluetooth Low Energy (BLE), Low Frequency, and/or similar wireless communication technology. In an example, the sensing system external receiver may be in the form of a mobile phone, a vehicle ECU, or alternative electronic device capable of storing, interpreting, displaying and/or again transmitting data that is output from the electrical sensor device. In an example, the sensing system external receiver may be in the form of a signal repeater or booster which will again transmit the original signal or a variation of translated, filtered or similarly altered data of the electrical sensor device wirelessly or by wired connection to another external receiver as such would be useful when the range of the wireless signal from the electrical sensor device is exceed such as with multi-axle, commercial fleet vehicles. In an example, the sensing system external receiver may be configured to clone the RF protocol of a traditional TPMS sensor and assign it to the electronic sensor device for communication with a separate external receiver such as a vehicle ECU. In an example the sensing system external receiver may comprise multiple, unique RF protocols which can be selected and assigned via LF communications to the electrical sensor device and then transmitted via LF communication with a separate external receiver such as a vehicle ECU. In an example, the sensing system external receiver contains multiple, unique RF protocols which can be selected and assigned via BLE or similar wireless communications to the electrical sensor device for LF communication with a separate external receiver such as a vehicle ECU which requires a specific RF protocol.

In an example, the sensing system comprising the sensing assembly and external devices is capable of calculating a tire tread depth condition, e.g., when the rubber article is a vehicle tire. In such example, the external receiver collects raw data from an accelerometer sensor that is connected with the electrical sensor device and utilizes one or more filtering algorithms and fast furrier transformation (FFT) algorithm from which the external receiver can determine the specific rotational speed of the vehicle tire at a given velocity from which the vehicle tire tread depth can be calculated using known industry tire tread depth parameters, which parameter may be stored and available to a processor for purposes of calculating the tire tread depth. In an alternative example, the sensing system external receiver collects raw data from an gyroscope that is connected with the electrical sensor device and which is used to calculate vehicle geometry from which vehicle tire tread depth can be calculated. Additionally the gyroscope may provide information used to determine the alignment of the tire, e.g., camber and/or toe parameters. In an example, the sensing system external receiver collects raw data from an accelerometer sensor that is connected with the electrical sensor device and which is used to calculate vehicle camber and toe alignment variations, wherein an external processor may be used to provide such calculations. In an example, the sensing system may be configured with the sensor assembly electrical sensor device comprising a global positioning sensor or system that may be used to transmit the location of the rubber article, e.g., vehicle tire, within which the sensor assembly is attached to an external receiver. In an example, the sensor assembly and sensing system as disclosed herein may include storage and processing devices for the purpose of determining the above-described parameters and/or storing desired operating parameters, wherein such storage and/or processing devices may be disposed with the electrical sensor device and/or the external receiver or other external device, and wherein such operating parameters may be used for research and/or commercial purposes.

The sensor assembly may comprise a retaining member configured to accommodate attachment of the housing therewith, wherein the retaining member has an outside surface configured for attachment with the vulcanized rubber article. In an example, the housing and retaining member may be attached together by mechanical or bonding attachment mechanism. In an example, the housing and electrical sensor device disposed therein may be removed from the retaining member without the use of tools. In an example, the housing and retaining member are configured having a complementary shape to facilitate attachment of the housing with the retaining member. In an example, the housing comprises a wall structure that surrounds the internal cavity, and wherein the retaining member comprises a wall structure having an open chamber that is configured to accommodate the housing wall structure therein to provide attachment therewith. In an example, the housing outer surface includes one or more display features or indicia that are viewable to a user when the housing is attached with the retaining member.

In an example, the retaining member is formed from an elastomeric material that mitigates transmission of shock forces from the vulcanized rubber article to the housing when the retaining member is attached to the vulcanized rubber article and the housing is attached to the retaining member. In an example, the vulcanized rubber article is a vehicle tire, and the retaining member is attached to an inside surface of the vehicle tire. In such an example, the retaining member is attached to an inside surface of the vehicle tire, and such attachment may be provided by the use of an adhesive layer that is interposed between the retaining element and the vehicle tire inside surface. In an alternative example, the retaining member may be vulcanized to the rubber article during a curing manufacturing process of the rubber article. In an example, the housing, electrical sensor device disposed therein, and the retaining member may be removable from the vulcanized rubber article.

An example method for using pressure assemblies and sensing systems as disclosed herein comprises installing the electrical sensor device within the housing internal cavity such that the electrical sensor device placement is mechanically fixed therein and the electrical sensor device is surrounded by the housing, and attaching the housing to the retaining member. In an example, the retaining member may be adhesively attached to an already vulcanized rubber article, which adhesive attachment may be done by hand pressure. In an example, a target surface of the vulcanized rubber article may be cleaned or otherwise prepared for attachment with the retaining member. Alternatively, the retaining member may be vulcanized with the rubber article during a curing process. In an example, the retaining member may be attached with the rubber article before the housing is attached to the retaining member. Alternatively, the retaining member may be attached with the rubber article with the housing already attached with the retaining member. In an example, the housing is oriented with respect to the retaining member according to the display feature on the housing. Once the retaining member and housing are both attached with the desired rubber article, the sensor assembly is used to monitor an operating parameter through the use of the electrical sensing device, wherein information related to the operating parameter is wirelessly transmitted from the electrical sensing device to a receiver that is part of the sensing system and that is external from the sensor assembly.

Configured in the manner described above, sensor assemblies and sensing system enable and facilitate monitoring a number of operating parameters and/or conditions of the dynamic object attached with the sensor assembly, e.g., a vehicle tire, not otherwise possible given the conventional state of such technology, and does so in a manner that enables such monitoring wirelessly through the use of commonly-used external devices such as vehicle ECUs, mobile phones, tablets, and the like.

BRIEF DESCRIPTION OF THE DRAWINGS

Vehicle tire monitoring sensor assemblies and systems as disclosed herein will now be described by way of example with reference to the accompanying figures, wherein like reference numerals refer to like elements, and of which.

DESCRIPTION

Figure 1:
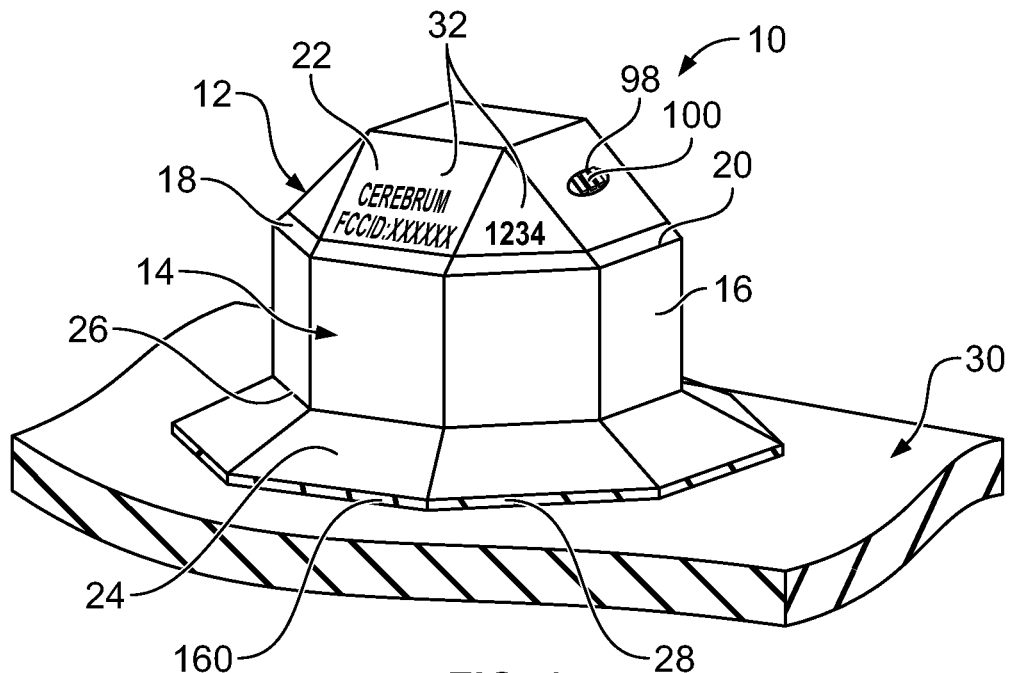
FIG. 1 is a perspective view of a sensor assembly, in accordance with various embodiments.

Embodiments of sensor assemblies and systems for monitoring dynamic objects will be described hereinafter in detail with reference to the attached drawings, wherein like reference numerals refer to the like elements. Sensor assemblies and systems as disclosed herein may, however, be embodied in many different forms and should not be construed as being limited to the embodiments set forth herein; rather, these embodiments are provided so that the disclosure will be thorough and complete, and will fully convey the concept of pass through plates and electrical conductors to those skilled in the art. Further the type of dynamic objected used with sensor assemblies and systems as disclosed herein can and will vary depending on the particular use application. For example, the dynamic object or article can be one that generally moves, rotates, stretches, etc. Thus, while sensors assemblies and systems as disclosed herein will be described and illustrated as being used with a vulcanized rubber article, e.g., a vehicle tire, it is understood that such sensor assemblies and systems are intended to be used with other types of dynamic objects, e.g., those that may be used in other types of applications in other industries including an not limited to sports & fitness, industrial, electrical and the like for purposes of monitoring certain operating parameters/conditions of the same.

In an example, sensor assemblies and systems as disclosed herein embodied for use with a vehicle tire seek to fulfill the shortcomings of both traditional TPMS systems as well as the few existing vehicle tire-mounted monitoring products, thus advancing industry vehicle safety and performance with a total tire monitoring system.

Generally, sensor assemblies as disclosed herein are configured to both accommodate attachment of a desired electrical sensor device within an internal cavity, and facilitate attachment of the sensor assembly with a surface of a dynamic object. In an example, the dynamic object may be a vulcanized rubber article such as a vehicle tire in accordance with a specific application method developed to ensure durability and functionality throughout the lifecycle of use for the vulcanized rubber article. The combination of the specific sensor assembly configuration and method for affixing the sensor assembly to the vulcanized rubber article, enables use of systems as disclosed herein to obtain information from the sensor assembly to measure, monitor, determine and/or report data relating to such features or parameters as the operating conditions, orientation, and/or location of the vulcanized rubber article, specifically a vehicle tire.

FIG. 1 illustrates an example embodiment sensor assembly 10 as disclosed herein comprises a housing 12 that includes an internal cavity (shown in FIG. 3) that contains an electrical sensor device (shown in FIG. 3) therein. In an example, the housing 12 is disposed within a retaining member or retainer 14 that is specifically configured to accommodate attachment with the housing 12 (e.g., placement of the housing 12 therein). In an example, the retainer 14 comprises a wall structure 16 (shown in FIG. 4) that is configured to surround and capture a wall structure of the housing therein. In an example, the retainer 14 may include a lip 18 that extends radially inwardly a distance from a first axial end 20 of the wall structure 16, wherein the lip 18 contacts an adjacent section of a top cover 22 of the housing to assist (by imposing a downward pressure on the housing top cover) retaining the housing 12 in a fully seated or disposed position within the retainer 14. The retainer 14 includes a base section 24 that extends radially outwardly a distance from a second axial end 26 of the wall structure 16 to thereby provide an increased surface area along a bottom surface 28 of the retainer 14 for attachment with a target surface of a vulcanized article 30 such as a vehicle tire.

In an example, the sensor assembly housing top cover 22 may include one or more display features 32 or indicia that may be disposed thereon or be integral therewith, which display features 32 may include indicia such as a model number, serial number, directional information, or any other type of indicia that may serve a purpose to provide information about the sensor assembly 10 to a user upon viewing such indicia. In an example, the display features or indicia 32 may be utilized for identification of the sensor assembly 10 such as brand, model or contents of the assembly; namely the technical specifications or Federal Communication Commission ID (FCC ID) of the electrical sensor device contained therein. The display features or indicia 32 may be printed or otherwise adhered to the housing top cover 22 or may be molded into the top cover 22. While FIG. 1 illustrates the use of display features 32 in the form of alphanumeric characters, it is to be understood that the display features 32 may be provide in the form of different shapes, objects, signs, figures and the like.

Figure 2:
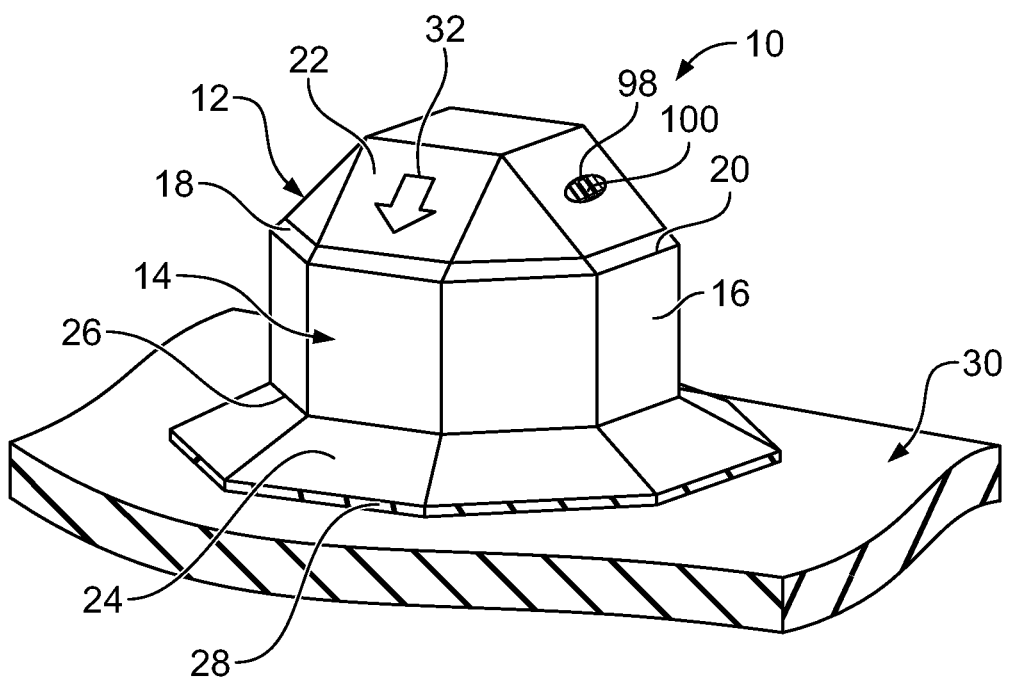
FIG. 2 is a perspective view of a sensor assembly, in accordance with various embodiments.

FIG. 2 illustrates an example sensor assembly 10 as disclosed herein, wherein the housing top cover 22 includes a display feature or indicia 32 in the form of an arrow that may provide orientation information to a user for the purpose of properly positioning the sensor assembly (such as "this end up" or an intended alignment direction of the sensor assembly 10) relative to a rotational direction of the vehicle tire to which the sensor assembly is to be attached.

The display features 32 or indicia may be constructed by way of applying the indicia to the housing top cover 22 by printing, stamping, or the indicia may be formed in the top cover itself by during the molding process of making the housing 12 or by subsequent technique of pressing, branding, or the like. While display features 32 as disclosed herein have been described and illustrated as being on a top cover 22 of the housing 12, it is to be understood that the display feature 32 may be positioned at different locations on the housing 12 that is viewable by a user and that all such other placement positions are intended to be within the scope of pressure assemblies disposed herein. Alternatively, the display feature 32 may be positioned on the retainer 14, or display features 32 may be positioned on both the retainer 14 and the housing 12.

Figure 3:
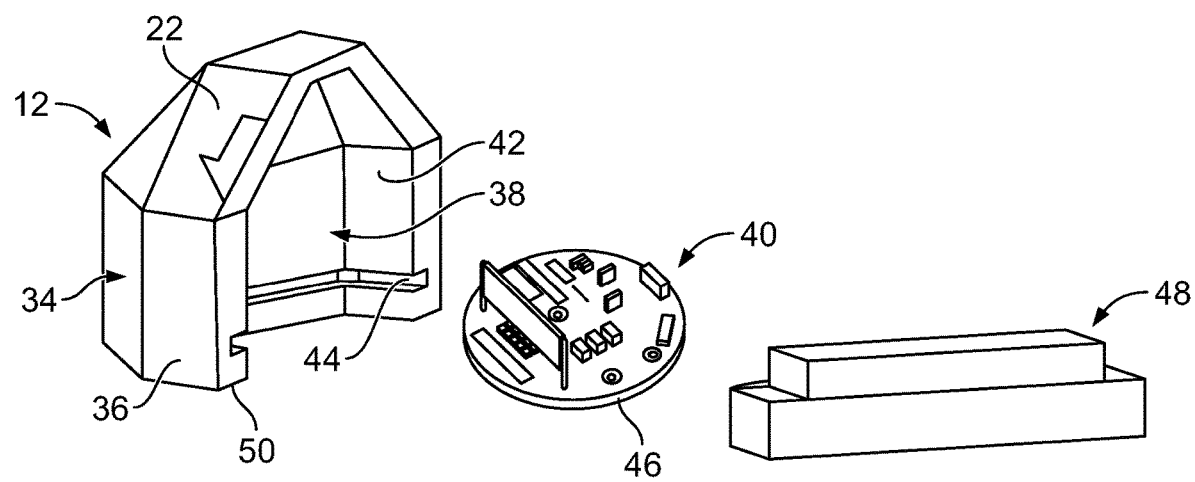
FIG. 3 is a perspective sectional view of a sensor assembly and electrical sensor device, in accordance with various embodiments.

FIG. 3 illustrates a cut-away view of an example sensor assembly housing 12 for the purpose of illustrating a wall structure 34 connected with and extending from the top cover 22, wherein the wall structure 34 defines an outer side surface 36 of the housing 12. The housing 12 includes an internal cavity 38 that is disposed within the top cover 22 and wall structure 34 and that is specially configured to accommodate placement of an electrical sensor device 40 therein. In an example, the wall structure 34 includes an inside wall surface 42 comprising a surface feature 44 that is specially configured to accommodate and retain placement of the electrical sensor device 40 therein. In an example, the surface feature 44 is provide in the form of a slot or recessed groove that extends laterally along the wall structure inside surface 42 and that is configured to accommodate placement of a peripheral edge 46 of a component of the electrical sensor device 40, e.g., a printed circuit board or the like, therein to thereby ensure secure fitment of the electrical sensor device 40 within the housing internal cavity 38.

While the surface feature 44 in this example is provided in the form of a recessed groove that extends completely around the wall structure inside surface 42, it is to be understood that the surface feature 44 may be configured differently for the purpose of functioning of securing fitment or attachment of the electrical sensor device 40 within the housing internal cavity 38 so the electrical sensor device 40 does not move therein. For example, rather than a recessed groove, the surface feature can be provided in the form ribs or tabs or the like that extend radially outwardly a distance from the wall structure inside surface 42 and that are positioned and configured to engage the electrical sensor device 40 peripheral edge 46 to secure placement of the electrical sensor device 40 within the housing internal cavity 38.

Further illustrated in FIG. 3 is a housing bottom section 48 shown in an unattached form that is configured for attachment with a bottom portion 50 of the housing wall structure 34 to thereby close off the housing internal cavity 38. In an example, the bottom section 48 may be formed separately from the housing top cover 22 and the wall structure 34, and may be attached to the wall structure 34 by mechanical attachment and/or by chemical or adhesive bonding. Thus, a feature of the housing 12 as disclosed herein is that it is specially configured to include an internal cavity configured to retain the electrical sensor device in an immovable fixed state therein, and to provide a protective surrounding to the electrical sensor device.

Figure 4:
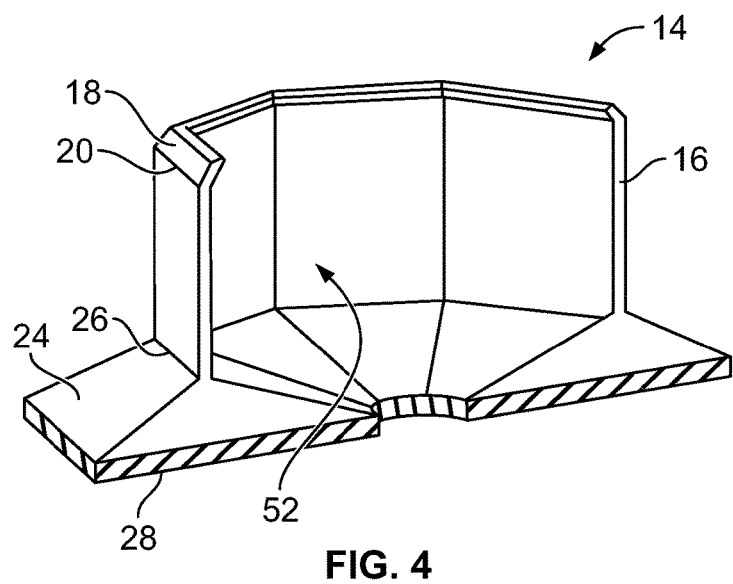
FIG. 4 is a perspective sectional view of a sensor assembly retainer, in accordance with various embodiments.

FIG. 4 illustrates a cut-away view of an example retainer 14 for purposes of better illustrating the configuration of the retainer wall structure 16 and an open chamber 52 that is formed within the wall structure 16 and that is configured to complement the housing wall structure 34 for accommodating placement/attachment of the housing 12 therein. Also illustrated is the lip 18 that extends radially inwardly from the wall structure first axial end 20 that is configured to fit over a portion of the housing top cover 22 when the housing 12 is disposed within the open chamber 52 to help retain placement of the housing 12 within the retainer 16. Further illustrated is the base section 24 that extends radially outwardly a distance from the retainer wall structure second axial end 26 that gives an enhanced surface area along the bottom surface 28 to provide a strong adhesive attachment with a target surface of the vulcanized rubber article, e.g., vehicle tire.

While the above described figures illustrate a housing 12 having a top cover 22 configured with a domed shape defined by a flat or planer top surface a number of flat surfaces extending in an angular manner downwardly and outwardly therefrom, it is to be understood that the top cover 22 may be configured differently as called for by the particular end-use application and/or as called for by the configuration of the internal cavity 38 useful for accommodating the electrical sensor device 40 therein, and all such different configurations are intended to be within the scope of sensor assemblies as disclosed herein. The same is true for the configuration of the housing wall structure 34 and the complementary configuration of the retainer wall structure 16 for accommodating placement of the housing 12 therein. While housing and retainer wall structures having an octagonal configuration have been illustrated, it is to be understood that the housing and retainer wall structures may be configured differently as called for by a desire to ensure secure and nonrotatable placement of the housing 12 relative to the retainer 14, the particular end-use application, and/or as called for by the configuration of the internal cavity useful for accommodating the electrical sensor device therein, and all such different configurations are intended to be within the scope of sensor assemblies as disclosed herein.

Figure 5:
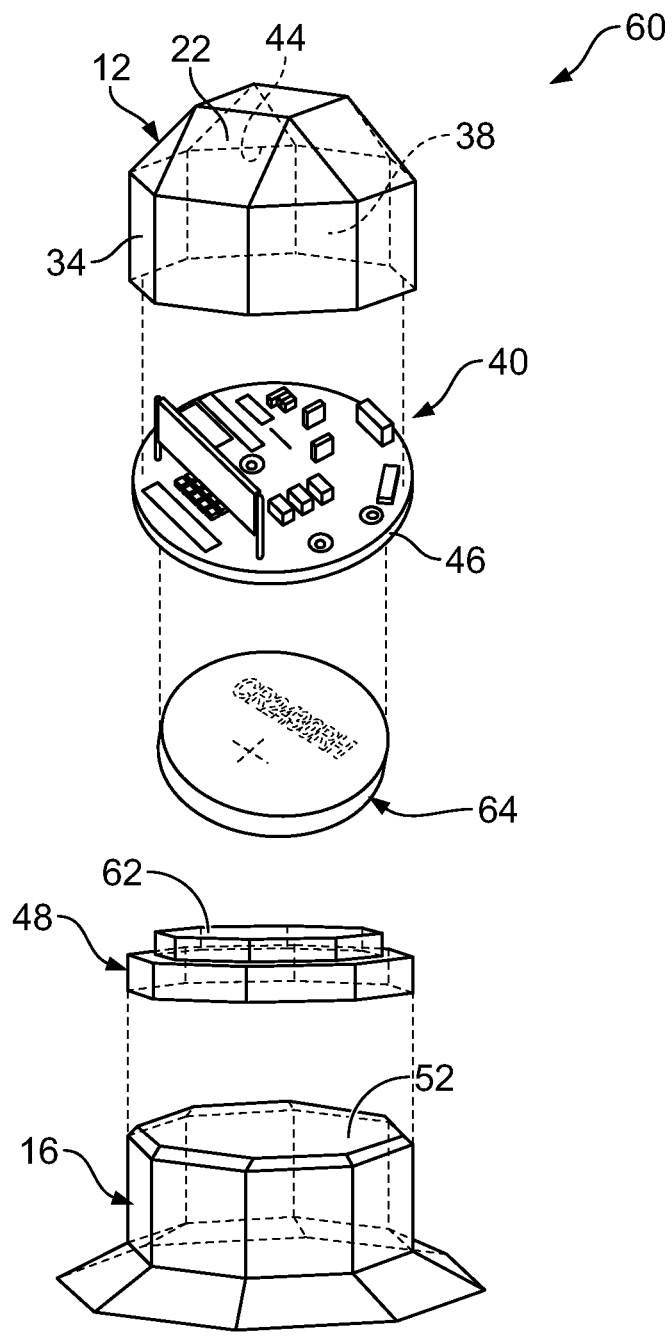
FIG. 5 is a perspective exploded view of a sensor assembly in an unassembled state, in accordance with various embodiments.

FIG. 5 illustrates an example sensor assembly 60 in an unassembled state showing a portion of the housing 12 including the top cover 22 and the wall structure 34 in an assembled state and comprising the internal cavity 38 disposed therein. In an example, the internal cavity 38 includes one or more surface features 44 positioned along the wall structure inside wall surface 42 that operates to fix an axial placement position of the electrical sensor device 40 therein. In an example, the surface feature may be in the form of a continuous element or the form of a number of individual elements such as ribs or tabs that project outwardly from the inside wall surface 42 and that contact an upper surface of a peripheral edge of the electrical sensor device 40. In this example, the surface feature 44 is an edge formed between the intersecting inside surfaces of the housing wall structure and top cover.

A housing bottom section 48 is positioned below the housing wall structure 34 and is configured having an internal surface 62 configured to accommodate placement of a battery 64 therein. The above-described sensor assembly components are assembled by loading the electrical sensor device 40 into the housing internal cavity 38 such that axial movement of the electrical sensor device 40 is limited by the inside wall surface feature 44, and the battery 64 is disposed onto a backside surface of the electrical sensor device 40 that includes contacts thereon to provide an electrical connection with the battery. Then the housing bottom section 48 is attached to the housing wall structure 34 such that the housing 12 protectively surrounds the electrical sensor device therein. In an example, the bottom section 48 may be mechanically attached to the housing wall structure 34, e.g., by complementary surface features that operate to form a mechanical attachment (such as a threaded attachment, and tongue in grove attachment, a snap attachment, and the like) and/or by chemical or adhesive bonding or the like. Once the housing 12 is assembled, it may be disposed within the open chamber 52 and attached to the retainer 16 in the manner described above.

Figure 6:
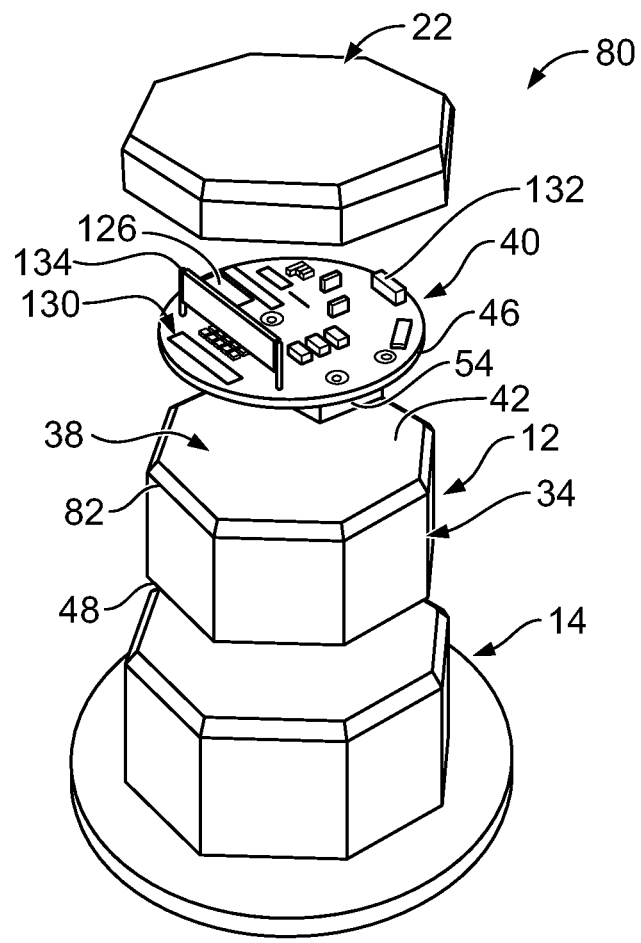
FIG. 6 is a perspective exploded view of a sensor assembly in an unassembled state, in accordance with various embodiments.
Figure 7:
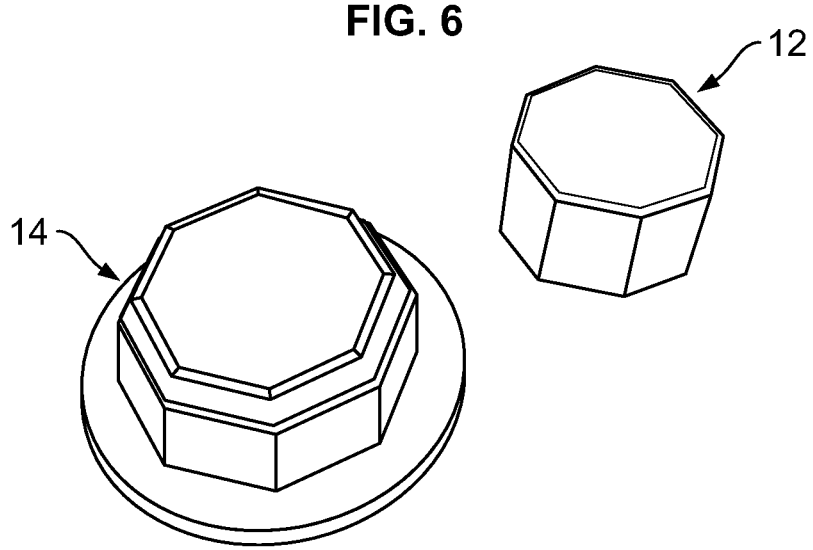
FIG. 7 is a perspective view of a sensor assembly housing and retainer in an unassembled state, in accordance with various embodiments.

FIG. 6 illustrates an example sensor assembly 80 comprising a housing 12 that is configured somewhat differently from that described above and illustrated in FIG. 5. Specifically, the housing 12 comprises a wall structure 34 and bottom section 48 that is provided in an assembled state, wherein the wall structure 34 and bottom section 48 may be mechanically attached, bonded together, and/or provided in the form of a one-piece molded construction. In an example, the housing wall structure 34 and bottom section 48 are provide in the form of a one-piece molded construction. The housing 12 includes an inside cavity 38 that is configured having one or more surface features (not shown) disposed therein that engage an underside of the electrical sensor device 40 peripheral edge 46 to fix axial displacement of electrical sensor device 40 within the inside cavity 38. In an example, the surface features may be in the form of one or more ribs or tabs that project outwardly a distance from the wall structure inside surface 42. The housing 12 includes a top cover 22 that is configured to attach over an opening 82 of the housing inside cavity 38, which attachment may be mechanical and/or bonded. In an example, the sensor assembly 80 is assembled by inserting the electrical sensor device 40 into the housing inside cavity 38 until the surface features engage the electrical sensor device 40 to fixedly limit its axial displacement therein. The housing top cover 22 is then positioned over the inside cavity opening 82 and is attached to the housing wall structure 34. In an example, the housing top cover 22 may include one or more surface features disposed therein that contact the electrical sensor device 40 for the purpose of fixing its position within the housing internal cavity 38 so it does not move therein once the top cover 22 is attached over the internal cavity opening 82. FIG. 7 shows the housing 12 in an assembled state with the electrical sensor device disposed thereon. Once the housing 12 is assembled, it may be disposed within and attached to the retainer 14 in the manner described above. Sensor assembly housings 12 as disclosed herein are constructed to provide the internal cavity 38 configured in a manner to fixedly retain and house the electrical sensor device 40 therein without the need for filling agents or materials. In an example, the housing 12 and internal cavity 38 may be constructed via multiple techniques by way of a single material element or multiple material elements. In the case of a single material element construction, the sensor assembly housing 12 may be formed as a one-piece construction around the electrical sensor device 40 by injection molding process or the like. In such example, the housing top cover 22, wall structure 34, and bottom section 48 are provided in the form of the single element formed from the same material as described above. In the case of a multiple-element construction, the sensor assembly housing 12 may be formed from separate elements, wherein the elements may be mechanically attached with one another or bonded with one another after the electrical sensor device 40 has been disposed within the internal cavity 38.

Figure 8:
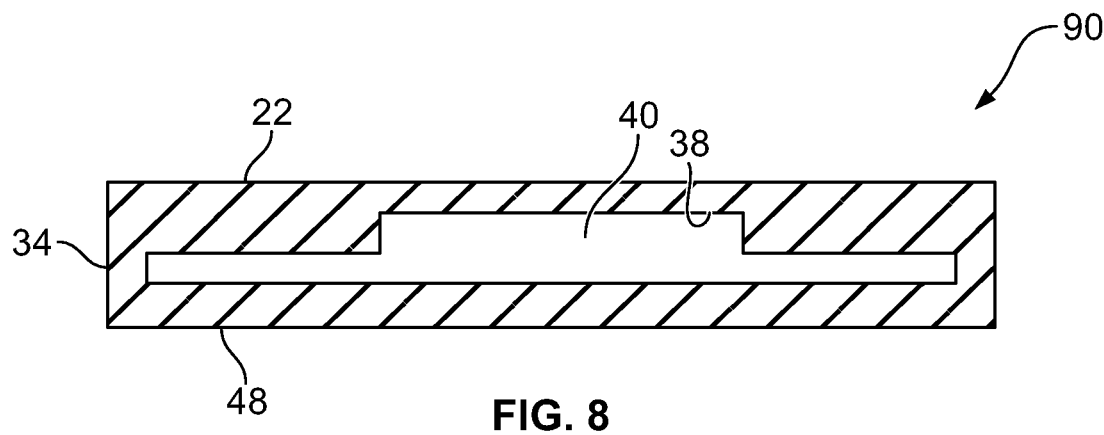
FIG. 8 is a cross sectional side view of a sensor assembly housing, in accordance with various embodiments.

FIG. 8 illustrates an example sensor assembly housing 90 formed from a single material element, e.g., wherein the top cover 22, wall structure 34, and bottom section 48 are all formed from a single material surrounding or encapsulating the electrical sensor device 40, e.g., during an injection molding process or the like. In this example, the housing internal cavity 38 is formed during the process of making the housing 90 by displacement by the electrical sensor device 40, and such encapsulation operates to fixedly retain placement of the electrical sensor device 40 therein. Like the housing examples described above, the housing 90 is configured to fit within a retainer 16 for purposes of attaching the housing 90 to the vehicle tire. Alternatively, a housing comprising a single material element construction can be first formed and then modified to include an internal cavity within which the electrical sensor device may be placed.

A housing may also be formed by using two material elements, wherein a first material element is accompanied by a second material element disposed beneath the first material element, and wherein a cavity is formed therebetween to contain the electrical sensor device. In such embodiment, the first and second material elements may be affixed to one another to surround the electrical sensor device therein simultaneously during the formation of the first and second material elements. In such embodiment, the first and second material elements may be formed from the same or different types of materials.

Figure 9:
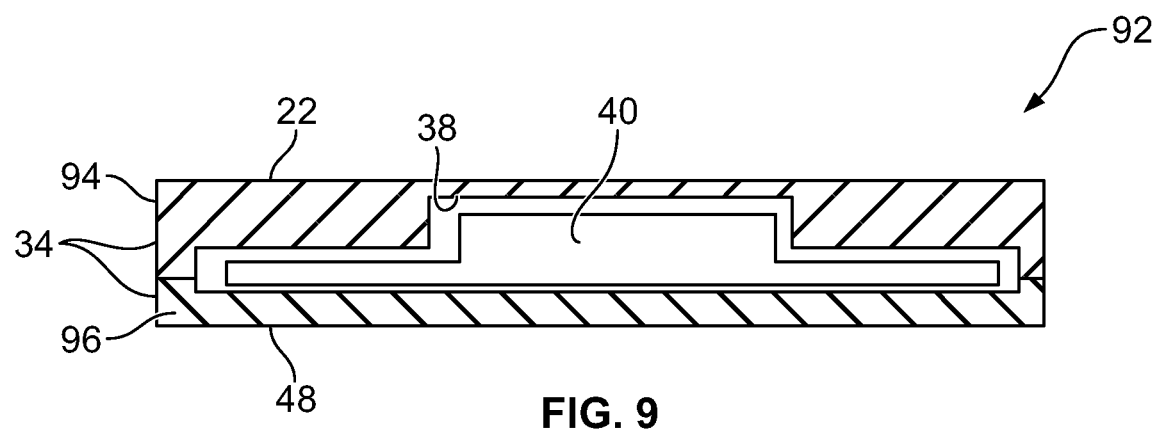
FIG. 9 is a cross sectional side view of a sensor assembly housing, in accordance with various embodiments.

FIG. 9 illustrates another example sensor assembly housing 92 as disclosed herein. In this example, a first material element 94 and a second material element 96 have already been formed in a specific shape so as to create the internal cavity 38 when the two layers are affixed together either mechanically or chemically after the electrical sensor device 40 has been disposed therein. In such embodiment, the first and second material elements may be formed from the same or different types of materials. In this example, the first material element 94 includes the top cover 22 and a portion of the wall structure 34, and the second material element 96 includes a remaining portion of the wall structure 34 and the bottom section 48.

Regardless of the construction, the material used to form the sensor assembly housing 12 as disclosed herein is one that is specifically and intentionally designed to protect the integrity and functionality of the electrical sensor device 40 that is disposed therein when installed within the retainer 14, attached to a tire, and placed into use given the demanding environment of a vehicle tire. Examples of materials useful for forming the housing 12 include, and are not limited to, those materials commonly used for TPMS housings such as rigid plastics as well as elastomeric materials commonly found in the tire and rubber industry like butyl rubber, EPDM rubber, natural rubber, or the like.

A feature of the material selected for forming the housing 12 is that such material operates to protect the electrical sensor device 40 disposed within the internal cavity 38 from contaminants such as oils and moisture, extreme temperatures, and forces such as acceleration, load, vibration, etc., that may be encountered during use within a dynamic object such as a vehicle tire. A further feature of the sensor assembly housings 12 as disclosed herein is the construction of the internal cavity 38 and the use of surface features 44 to mechanically fix and retain the placement position of the electrical sensor device 40 therein. A common technique used to assist in fixturing the electrical sensor device 40 known within the automotive industry is to fill the internal cavity with a coating material such as a neutral silicone or the like for purposes of retaining placement position. A feature of sensor assemblies as disclosed herein is that they do not use or require the use of any such coating or filling agents or materials for any fixturing of the electrical sensor device 40 within the internal cavity 38. Again, structural support of the electrical sensor device 40 within the internal cavity 38 to fix the position of the electrical sensor device 40 therein is provide by mechanical fixturing, e.g., through the use of surface features within the housing internal cavity 38. As noted above, such fixturing of the electrical sensor device 40 may be achieved by integrating the electrical sensor device 40 into the manufacturing process of the housing 12, e.g., such as by transfer or injection molding or the like as illustrated in in FIG. 9. In such example, the housing first material element 94 and second material element 96 comprise internal cavity profiles which are complimentary to the components of the electrical sensor device 40, which after assembly provides the necessary stabilization to the battery, sensors, or similar components.

Sensor assemblies as disclosed herein may include an electrical sensor device 40 comprising a sensor configured to rely on the pressure of the surrounding environment, which (when attached within a pneumatic vehicle tire) is the air pressure inside of the vehicle tire, e.g., for the purpose of providing an indication of vehicle tire pressure. In such sensor assembly embodiment, it is necessary that the housing 12 be configured to include one or more openings to provide air flow communication between such external environment and the electrical sensor device 40 disposed within the housing internal cavity 38. With reference to FIGS. 1 and 2, the sensor assembly 10 comprises the housing 12 that is configured to include an opening 98 positioned along the top cover 22. The opening 98 is configured and positioned to enable air outside of the housing to reach the internal cavity 38 and the electrical sensor device 40 disposed therein. It is well known that moisture and other contaminants exist within the assembly of a vehicle pneumatic tire and wheel with proper operating temperature. Therefore, for purposes of protecting the electrical sensor device 40 from such contaminants, it may be desired that a moisture barrier 100 be positioned within the opening 98 or within a cavity or the like that is interposed between the opening 98 and the electrical sensor device 40 for the purpose of permitting only filtered air to reach the electrical sensor device 40. In an example, the moisture barrier 100 may be in the form of a filter element or a molecular sieve, and may or may not be configured to be removable and/or replaceable.

Figure 10:
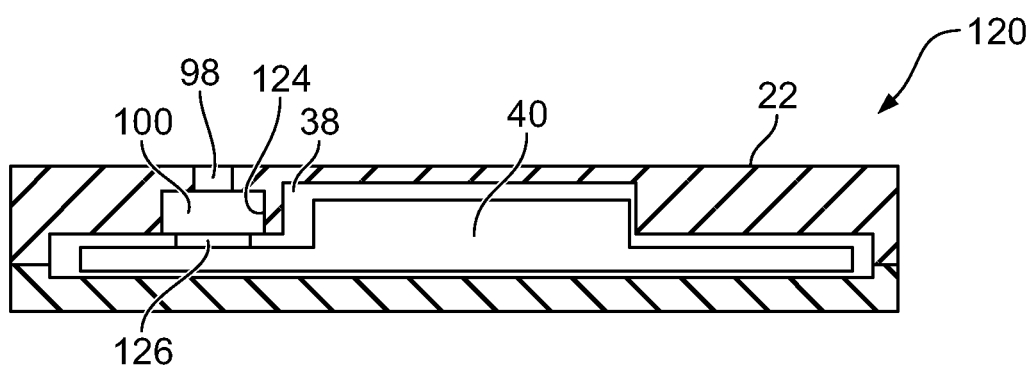
FIG. 10 is a cross sectional side view of a sensor assembly housing, in accordance with various embodiments.

FIG. 10 illustrates an example sensor assembly housing 120 that includes a top cover 22 configured to include an opening 98 therethrough to permit air from the external environment, e.g., the air within a pneumatic tire when the sensor assembly is disposed within a vehicle tire, to access the internal cavity 38 and the electrical sensor device 40 disposed therein. In this example, the housing top cover 22 includes a cavity 124 that is downstream from the opening 98 and that includes a moisture barrier 100 disposed therein. In this example, the cavity 124 and moisture barrier 100 are positioned adjacent a sensor 126 of the electrical sensor device 40 that is configured to sense the pressure of the air. As noted above, configured in this manner, only filtered air reaches the electrical sensor device 40 and sensor 126.

In an example embodiment, the electrical sensor device 40 disposed within the sensor assembly housing 12 may comprise a variety of different electrical components as called for by the particular end-use application and types of operating parameters to be measured, monitored and/or determined. In an example, with reference back to FIG. 5, the electrical sensor device 40 may comprise a number of components that may include a printed circuit board 130, one or more sensors 126 configured to measure operating parameters such as operating conditions, orientation, and/or location and the like, one or more transmitters 132, one or more antennas 134 for wireless transmission of the monitored operating parameters from the electrical sensor device 40 and for wireless receipt of information from an external device, a portable power source or battery 64, and all necessary electrical connections and circuitry. It is to be understood that the electrical sensor device 40 as disclosed herein may be configured differently depending on the particular tire data or operating parameters to be monitored, and this is but one example of the same for purposes of reference and example.

In an example, the portable power source 64 may be in the form of a lithium ion or nickel metal hydride battery. Alternatively, the electrical sensor device 40 may be designed in such a manner so as to receive power through the kinetic energy forces of the tire movement. In such variation, the functionality of the electrical sensor device 40 may be minimized due to limitations of the power source. Therefore, it is preferred that sensor assemblies as disclosed herein comprise an electrical sensor device 40 that utilizes a lithium ion battery as is commonly used in the automotive industry and proven to achieve several years of use thereby enabling the sensor assembly 10 to be re-used between multiple sets of vehicle tires.

For pressure sensor assemblies as disclosed herein configured for use in a tire-mounted application, it is desired that the electrical sensor device 40 include at least one sensor 126 preferably a microelectromechanical (MEMS) pressure and temperature sensor as is common in traditional TPMS devices. Utilizing pressure and temperature sensors along with other necessary components, the sensor assembly can communicate conditions of the tire with a receiver such as the vehicle ECU, a mobile device, or the like. As indicated, these sensors are well utilized throughout the automotive industry and therefore for advancement of tire technology it is preferred that the electrical sensor device 40 possess additional sensors and functionality such as accelerometers, gyroscopes, RFID tag, and/or GPS technology. In the circumstance of the electrical sensor device 40 including an accelerometer, the sensor assembly can be utilized for analyzing advanced tire conditions such as traction, alignment variations and even tire tread depth. In another variation, the electrical sensor device 40 configured to include gyroscope sensor technology would enable the calculation of tire orientation such as for slip angle or oversteer measurements which are of particular importance in the motorsports industry. The gyroscope may be used to provide tire alignment information such as toe and/or camber position, and well as being useful for determining tire tread depth. Further, the electrical sensor device 40 configured to include GPS technology is of significant value for loss prevention of tires and/or vehicles as are susceptible to theft.

In an example, it is desired that the electrical sensor device 40 be configured to include electrical components that enable minimal storage capability. Though the majority of the raw data collected from the sensor(s) of the electrical sensor device will be transmitted through wireless communication to a receiver(s), storage capacity by the electrical sensor device 40 is very desired and useful. In an example, it is desired that the storage capacity be read/write capable to support over writing of non-essential data. In an example, it is desired that the storage capacity of the electrical sensor device 40 support firmware updates or similar functions common with electronic units. In the particular circumstance of use as a tire sensor assembly, the storage capacity will contain information such as the sensor identification number and/or or unique protocol information through which the sensor is capable of communicating with the vehicle ECU. Further still, with storage capacity the sensor assembly can contain vehicle information such as the Vehicle Identification Number (VIN) which can be utilized for tracking and security purposes such as by fleet business or regulatory authorities like the Department of Transportation.

In an example, the electrical sensor device 40 may comprise connectors through which firmware updates or data which is stored in the device may be transmitted to and/or from an external device such as a receiver or the like. However, in a preferred embodiment, it is desired that the electrical sensor device 40 comprise one or more antennas 134 through which information can be communicated wirelessly. Such feature of wireless information/data transmission to and/or from the electrical sensor device 40 to a remote device is of particular advantage when the sensor assembly comprising the same is attached within a pneumatic tire, mounted to a wheel and vehicle wherein the sensor assembly is not easily accessible for the use of connectors. The use of RF technology as is common with direct TPMS units located within the mounted tire and wheel assembly or BLE communication as found with valve-stem cap-mounted aftermarket TPMS devices are preferred though other forms of wireless communication may be utilized.

Figure 11:
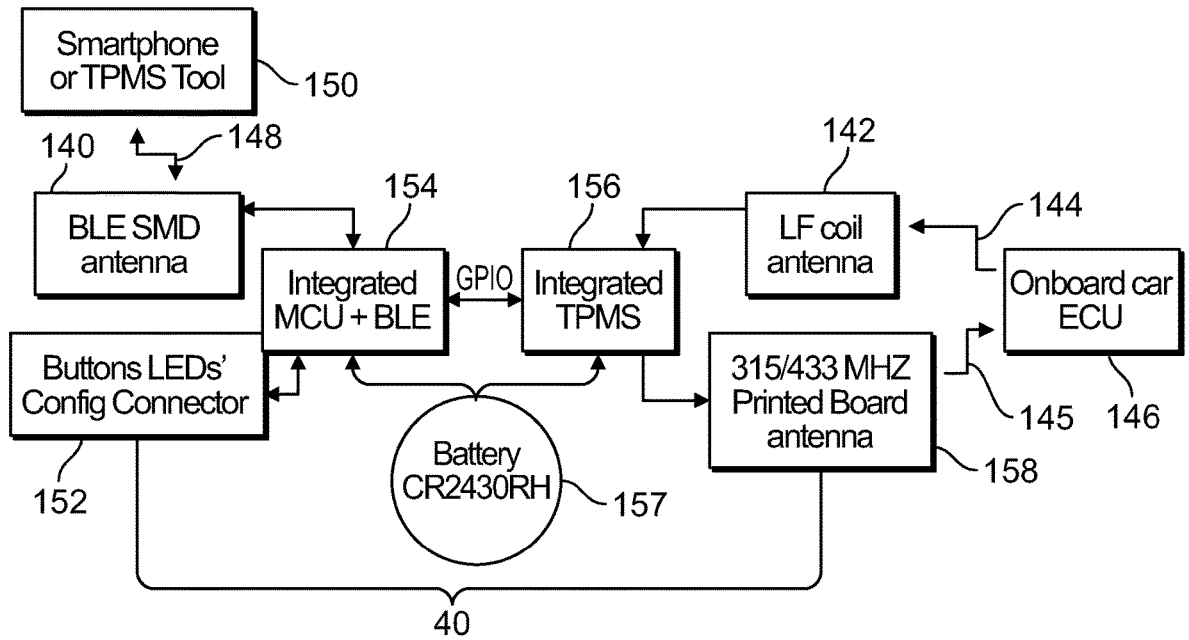
FIG. 11 is a block diagram view of data flow and electrical components of a sensor assembly and system, in accordance with various embodiments.

FIG. 11 illustrates an example of the different components that may be used with sensor assemblies and electrical sensor devices 40 disposed therein as disclosed herein. In such example, the electrical sensor device 40 may comprise one or both of an BLE antenna 140 and an LF antenna 142 to support traditional RF communication 144 and 145 with an ECU 146 of the vehicle as well as Bluetooth communication 148 with one or more receivers 150 such as mobile phones, tablets or smartphone-based vehicle information systems like Apple CarPlay or the like. FIG. 11 also illustrates the use of additional components which may not be necessary in all variations of the sensor assembly and system as disclosed herein. One such component is a button 152 which is useful for developers and manufacturing operations for activating or resetting a master control unit (MCU) 154. The electrical sensor device 40 may also contain an LED 152 to provide a visual indication that the device 40 is active and connections as aforementioned are relevant for development and firmware updates. FIG. 11 also depicts two primary components functioning as the MCU, BLE and TPMS units 154 and 156 (where the MCU and BLE units may be provided in the form of an integrated unit), which are utilized in an example embodiment though may not be necessary in other variations that still fall within the scope of sensor assemblies and systems as disclosed herein. In an example, a portable power source 157 is provided in the form of a lithium coin battery to provide power to one or all of the MCU/BLE and TMPS units 154 and 156. FIG. 11 also features the printed circuit board (PCB) and multiple frequency antennas 158 as are used for communication with a vehicle ECU 146. It is preferred for the electrical sensor device 40 to contain components supporting multiple frequencies (i.e. 315 MHz and 433 MHz) which can communicate universally with all vehicles on a global scale so-as to reduce manufacturing variation as well as inventory commonly stocked by wheel and tire shops. Additionally, the electrical sensor device 40 may include a processor (not shown) for purposes of processing data received from sensors or data received wirelessly from an external transmitter.

In an example embodiment where the electrical sensor device 40 comprises a number of sensors 126, the traditional vehicle ECU 146 is not capable of processing data beyond temperature and pressure communication from the sensor assembly. Therefore, a secondary wireless receiver with RF, BLE or similar capability, configured to receive the wireless signals provided from the electrical sensor device, is useful for the purposes of being able to access and process advanced tire analytics. However, it is intended that with the development of sensor assemblies as disclosed herein, automobile manufacturers will integrate receiving capability of the advanced data provided by the sensor assembly to the vehicle ECU for convenience of drivers as well as to further the capability of autonomous vehicles which rely almost entirely on data transmitted from sensors.

In an example, the sensor assembly retainer 14 may be made from materials that facilitate a secure attachment with the housing 12, and that promotes a strong adhesive attachment with the target surface of a vehicle tire. In an example, the material may be selected to support mechanical attachment and/or chemical bonding with housing 12. In an example, the material selected for forming the retainer 14 may be one that is capable of absorbing shock and/or forces such as deformation or the like commonly experience in a vehicle tire for the purpose of minimizing or mitigating the transmission of such forces to the housing 12 and the electrical sensor device 40 disposed therein to thereby extend the effective service life of sensor assemblies as disclosed herein. In an example, the retainer 14 may be formed from materials including, but not limited to, EPDM rubber, natural, butyl or similar rubber compounds such as is common with tire patches and that provide resistance to weather, water, greases, and acids, and that maintains sufficient flexibility in varying temperature conditions which are found to range beyond −50° F. to 250° F. in common consumer and beyond for motorsports tire applications.

In an example, using a material having shock absorbing properties for forming the retainer 14 enables the use of a rigid plastic material for forming the housing 12 as is commonly found with traditional direct TPMS sensor devices. These materials may be of preference for forming the housing 12 due to manufacturing cost savings. Without having a separate retainer 14 and the ability to form the retainer 14 from a shock absorbing material selected to promote attachment to the vehicle tire, the rigid housing 12 and electrical sensor device 40 would be susceptible to failure and/or damage to the electrical sensor device 40, failed bond with the tire, and/or excessive resistance to flexibility of the tire rubber where the sensor assembly unit is affixed. Naturally these conditions present functionality and safety concerns. As such, a feature of sensor assemblies as disclosed herein is the ability to select the material for making the retainer 14 so as to minimize, mitigate, and/or eliminate such functionality and safety concerns.

In an example, where the retainer 14 may be bonded with the housing 12, it is desired that the material selected for forming the retainer 14 be one that is compatible with and promotes a desired bond strength with housing 12 in the event that the housing 12 is chemically bonded with the retainer 14. In the circumstance of chemical bonding between the retainer 14 and housing 12, commonality of material is desired to ensure durable connection between the components. In such example, it may be desired to make the retainer 14 and housing 12 each from EPDM rubber to support the use of a rubber bonding adhesive such as a cyanoacrylate, pressure-sensitive, or chemical vulcanizing agent as is common in the tire patch and repair industry.

Alternatively, in the circumstance where different materials are used for forming the retainer 14 and the housing 12, e.g., where the retainer 14 is made from EPDM rubber and the housing 12 is made from rigid plastic or metal, it would be desired to utilize complimentary shapes for the purpose of providing a mechanical attachment between the retainer 14 and housing 12. In such an example (as illustrated in FIGS. 1, 6 and 7), attachment of the housing 12 to the retainer 14 would rely on mechanical fixturing techniques that may include complementary surface features and/or the use of additional attachment elements such as dowels, screws, rivets or the like.

The examples illustrated in FIGS. 1, 6 and 7 rely on a mechanical mating of the housing 12 within the open chamber 52 or pocket of the retainer 14, wherein the retainer 14 comprises a wall structure 16 that complements that of the housing wall structure 34 to accommodate placement and mechanical retention of the housing 12 within the retainer 14 by means of contact between the complementary adjacent wall structures. In an example, it is desired that the housing 12 be attached to the retainer 14 through the use of a mechanical attachment for purposes of being able to readily remove and reuse the housing 12 and electrical sensor device 40 therein (e.g., when placed within a tire) to facilitate removal from an old, worn and/or failed tire and installation into a replacement tire. This is especially desired when sensor assemblies as disclose herein are used in tires placed into use in the motorsport industry where tires are replaced frequently.

That said, the mechanical bonding of the retainer 14 and housing 12 containing the electrical sensor device 40 would permit transfer of the critical and costly components to another vehicle tire such as when the retainer 14 is permanent affixed to the vehicle tire. Other variations of mechanical mating the retainer 14 and housing 12 may be utilized, however, the 'pocket' technique is the preferred variation as this does not require the use of tools for application or removal. A desired feature of the retainer 14 and housing 12 mechanical attachment configuration illustrated in FIGS. 1, 6 and 7 is that such permits the removal of the housing 12 from the retainer 14 without having to use special tools. Further, there may be an instance where the retainer 14 is vulcanized to the rubber article, such as during the green tire manufacturing process. In this instance the retainer 14 is permanently affixed to the tire and cannot be used in another tire vehicle. In such case, mechanical attachment of the housing 12 to the retainer 14 is desired to enable removal of the housing 12 therefrom for reuse in another tire.

In an example, the retainer 14 is configured to be affixed to a target surface of an already vulcanized rubber article 30, e.g., a vehicle tire, utilizing an adhesive layer 160 (as shown in FIG. 1). In a preferred embodiment, the adhesive chosen for affixing the retainer 14 to the vulcanized rubber article 30 is a cyanoacrylate adhesive given the adhesive's permanent rubber bonding and fast drying properties which are of interest in high volume applications, though other comparable chemical or heat vulcanizing adhesives may be selected. In this circumstance, the housing 12 would be removed from the retainer 14 since the bond between intermediate absorption layer and rubber article is intended to be permanent. Alternatively, pressure sensitive adhesives may be used to support ease of removal of the entire sensor assembly (including the retainer) from the vulcanized rubber article for use in another application. In the situation where the vulcanized rubber article is a vehicle tire, this feature of ease of removal and reuse of the housing 12 and the electrical sensor device 40 disposed therein is of particular significance given that the frequency in which tires are replaced is higher than that of the life of the power source for the electrical sensor device 40.

For use of sensor assemblies as disclosed therein, there are several methods that may be utilized for attaching the sensor assembly 10 to a target surface of a vulcanized rubber article 30. As previously discussed, the retainer 14 as the connection between the rubber article and the housing 12 and electrical sensor device 40. The retainer 14 can be affixed to the rubber article 30 through what is referred to as pre-cure or post-cure bonding. In pre-cure bonding, the retainer 14 is applied to a target surface of the uncured rubber article and cured along with the rubber article. This is commonly referred to the green tire process in the case which the rubber article is a vulcanized rubber article. It is a common variation to incorporate the use of heat cure adhesives to support the bond between the uncured retainer 14 and uncured rubber article in the circumstance that different elastomeric materials are selected. The pre-cure bonding technique is of preference for high volume production, to ensure consistency and quality of retainer 14 to the rubber article permanent bonding.

This pre-cure bonding technique, however, is a disadvantage in many respects as well. Because the pre-cure method requires vulcanization with the rubber article, it is generally necessary to produce a new mold. In the circumstance of tire manufacturing, mold production comes at a significant cost exceeding tens of thousands of dollars, and therefore it would be necessary to produce hundreds of thousands of tires to recognize a return on investment. In addition, if bonding of the retainer 14 is achieved during the pre-cure process then the ability to use sensor assemblies as disclosed herein could depend on the rubber article manufacturer rather than the user, e.g., one rubber article manufacturer may make tires with the retainer 14 while another rubber tire manufacturer may not make tires with the retainer 14 that would prevent use of the sensor assembly control.

Therefore, it is an alternative and preferred technique to achieve bonding of the retainer 14 and rubber article 30 in a post-cure method. As previously discussed, this can be done in a permanent manner utilizing heat, chemical or similar curing adhesives as well as pressure sensitive adhesives for a temporary bond. In this circumstance, it is desired to properly prepare the target surface of the vulcanized rubber article 30 which will support a proper bond. In the circumstance of a new vehicle tire, the target surface is likely to contain contaminants including waxes, oils, and mold release agents utilized in the manufacturing process.

Figure 12:
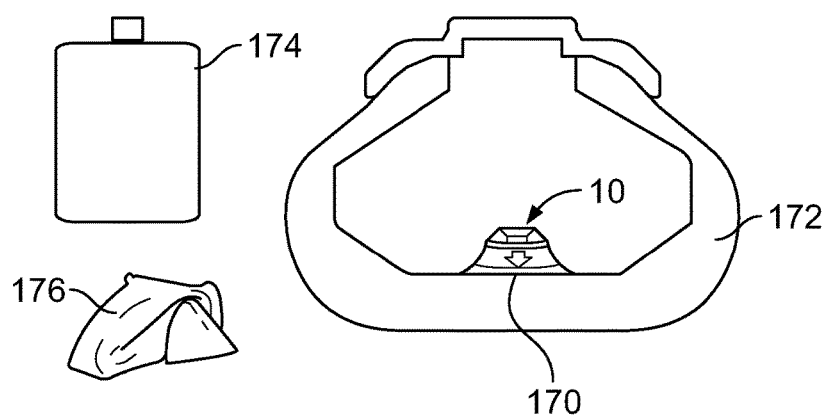
FIG. 12 is a perspective view of a sensor assembly attached with a vehicle tire and articles useful for attaching the same, in accordance with various embodiments.

FIG. 12 illustrates an example sensor assembly 10 as attached to a target surface 170 of inside portion of a vehicle tire 172 by the use of a suitable adhesive by post-cure method. In an example, before attaching the sensor assembly 10 the target surface 170 is treated for removal of contaminants, which may be done by using cleaning products and/or solvents 174 common in the tire and rubber industry such as pre-buff, degreaser, acetone, rubbing alcohol or similar and a clean towel or rag 176. It is also common, though not necessary, to roughen the surface of the rubber article which can be done with a common sand paper or the use of a specialized tool like a stitcher, roughener, dremel or similar. Roughening the surface can assist in the bond strength given the use of particular adhesives such as those common to the retread industry, however, other adhesives can achieve the intended bond without this roughening step. When the roughening technique is utilized, it is generally necessary to follow this step with the aforementioned cleaning technique. Further still, it may be necessary to remove tire insulation foam or similar materials which are known to be used by tire manufacturers for the purpose of noise dampening.

One further variation in the preparation of the target surface 170 includes marking the rubber article. This technique can be helpful in assembly line scenarios where the operator or machine cleaning and or roughening the surface may not also be applying the adhesive 160 and retainer 14, and therefore the area must be identified for the next stage of the assembly line. Alternatively, the rubber article may be cleaned and or roughened at one particular time, staged, and at a later time collected for application of the adhesive 160 and retainer 14.

Further, referring to FIG. 12, it may be of particular preference to place the sensor assembly 10 in a particular orientation and/or position on the rubber article surface 170 such as to compliment the rotational direction of a vehicle tire 172. For the above circumstances and those not mentioned, the application method may incorporate marking of the rubber article.

Figure 13:
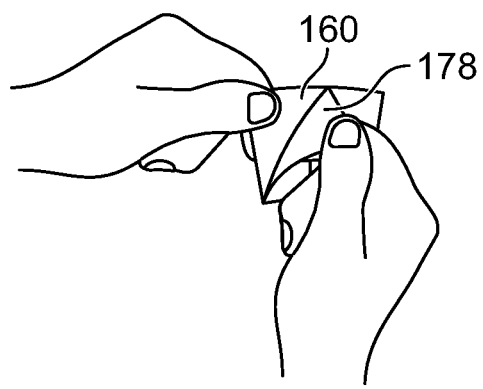
FIG. 13 is a perspective view of an attachment method for a sensor assembly including an adhesive layer, in accordance with various embodiments.

Once the surface of the rubber article has been properly prepared, the retainer 14 and adhesive layer 160 are bonded to the vulcanized rubber article. Depending on the chosen adhesive and other factors such as the skillset of the person or machine applying the retainer 14, the adhesive layer may be applied to the target surface 170 of the rubber article or to a bottom surface 28 of the retainer 14 or both. In the circumstance where the adhesive is pressure sensitive, it may be preferred to apply the adhesive layer to the bottom surface 28 of the retainer 14 such as through the technique of lamination. In this situation, lamination of adhesive to the retainer 14 can take place in the manufacturing process of the retainer 14 and at a later time and by an unrelated party. With reference to FIG. 13, the adhesive layer 160 can be easily activated for application to the rubber article, e.g., by removing a release liner 178 therefrom to thereby expose the adhesive layer surface.

In another example, the adhesive layer 160 may be applied to the surface of the rubber article directly. This can be done with nearly any variation of adhesive including but not limited to heat-activated, chemical cure or 2-part epoxy adhesives. An example where this approach may be of preference such as when the area of the rubber article chosen to receive the retainer 14 is clearly defined or when the adhesive possesses a low viscosity.

Once the adhesive layer has been applied and rubber article target surface properly prepared, the connection between the retainer 14 and rubber article can take place. At this point, the housing 12 and electrical sensor device 40 disposed therein may or may not be attached with the retainer 14. In the circumstance where the adhesive chosen is a heat-activated method, it would be preferred that the housing 12 is not affixed to the retainer 14 during the retainer attachment process as the curing process of the adhesive may require an elevated temperature beyond a threshold which the housing 12 and/or electrical sensor device 40 may withstand. Alternatively, a select adhesive may require significant use of pressure to achieve activation and lasting bond. This pressure may result in damage to the housing 12 and/or electrical sensor device 40 disposed therein and for this reason should not be attached with the retainer 14 during the step of attaching the retainer 14 to the rubber article. Still further, the bonding of the retainer 14 and rubber article may require the use of tooling whether by hand or machine, which may not be adapted to the profile of the housing 12. For these and other reasons not mentioned, in an example embodiment the step of attaching the retainer 14 to the rubber article is carried out without the housing 12 attached within the retainer 14.

Figure 14:
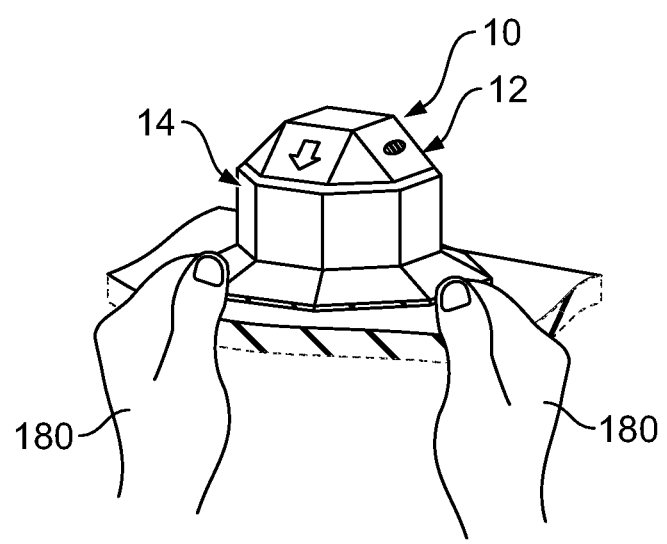
FIG. 14 is a perspective view of an attachment method for a sensor assembly involving hand pressure, in accordance with various embodiments.

Alternatively, it may be desired to bond the rubber article with adhesive to the entire sensor assembly; the retainer 14 as containing the housing 12 and the electrical sensor device 40 disposed within the housing 12. In this embodiment, the entire sensor assembly 10 can be bonded to the rubber article using a select adhesive without the need to later affix or attach the housing 12 to the retainer 14. This option may be of particular use when the application of the sensor assembly is performed by a consumer and reducing the number of required installation steps is preferred. With reference to FIG. 14, in an example, this option of installing the sensor assembly 10 with the housing 12 attached within the retainer 14 may be done by a user applying pressure to the sensor assembly 10 by their hands 180, e.g., by using hand pressure. As indicated previously, the sensor assembly 10 may alternatively be affixed to the rubber article using tooling which is of preference with high volume operations, use of machinery, and or when forces, temperatures or conditions exceed the capability of hand application.

As referenced, the sensor assembly housing 12 may be used for multiple purposes including ways related to the method of application. In an example shown in FIG. 1, the housing top cover 22 may include a display feature 32 configured to assist with installation, e.g., providing a desired installation orientation in which the sensor assembly 10 is to be attached and used relative to the rubber article. This may relate to the rotational direction of the tire or a particular orientation which supports more robust communication with the electrical sensor device 40 disposed within the housing 12. In another variation shown in FIG. 1, the housing top cover 22 comprises a display feature 32 that contains information such as a unique identifier which is used for setup and functionality of the sensor assembly 10. This unique identifier could include an electronic identification number through which receivers associate the sensor assembly for use in the sensing system such as identifying a particular vehicle tire from another. Still further, the housing display feature 32 may provide specification information such as an FCC ID or similar certification information about the electrical sensor device contained within. These are but a few examples of how the sensor assembly housing may include information useful to install and or use the sensor assembly.

Once the sensor assembly 10 is affixed to the rubber article, there is a method for removing the housing 12 and electrical sensor device 40 from the retainer 14 and rubber article, and reusing the same with a different rubber article. This is of particular importance when the rubber article is a vehicle tire which has a fixed lifespan that is generally shorter than that of the power supply of the electrical sensor device 40. In this scenario, the housing 12 is preferably mechanically affixed to the retainer 14 and easily removable therefrom. To promote reuse of the housing 12 and electrical sensor device 40, a new retainer 14 and adhesive are used to affix the retainer to the new tire, or perhaps the new tire already possess retainer 14 which was pre-cured with the rubber article as described above. In another embodiment, the entire sensor assembly 10 including the retainer 14 and housing 12 may be removed from the old tire and placed into a new vehicle tire or rubber article, e.g., through reuse of the existing adhesive or use of a new adhesive layer.

Figure 15:
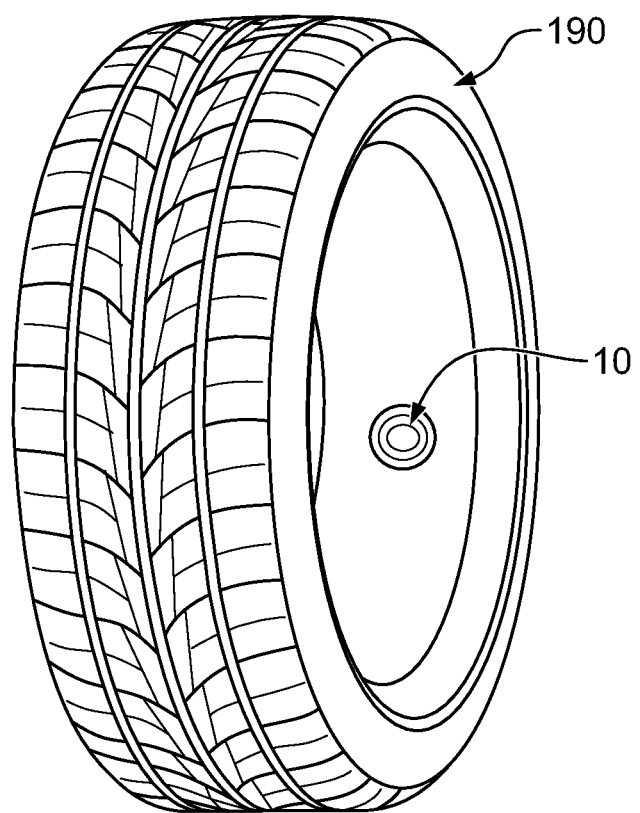
FIG. 15 is a perspective view of a sensor assembly attached with a vehicle tire, in accordance with various embodiments.

It is desired, such as for automotive aftermarket use of the sensor assembly, that the aforementioned application methods are selected through which jobbers and consumers are empowered to apply and utilize sensor assemblies as disclosed herein. However, pressure assemblies as disclosed herein may also be made and used at the rubber article manufacturing level. This approach supports mass distribution through traditional channels such as tire dealers and warehouses and supports efficiency and quality of the application of the sensor assembly. Therefore, as shown in FIG. 15, it is intended to be within the scope of sensor assemblies as disclosed herein the combination of sensor assemblies 10 with variations of a rubber article, such as a vehicle tire 190, which may already be equipped with the sensor assembly 10 by way of the methods aforementioned.

Lastly, the sensor assemblies and systems as disclosed herein comprise a sensing system that is designed to measure, monitor, and/or determine, and/or report operating conditions, orientation and/or the location of a vulcanized rubber article such as a vehicle tire. The sensing system comprises of the aforementioned components and methods including and not limited to:

A sensor assembly 10 comprising a housing 12, an electrical sensor device 40 within an internal cavity 38 of the housing 12, and a retainer 14 that is attached together with the housing 12;

applied to the vulcanized rubber article such as a vehicle tire;

by method of surface preparation and pre-cure or post-cure adhesion;

which communicates with one or more receivers having a plurality of antennas capable of receiving and sending wireless communication.

The sensing system relies on wireless communication techniques to relay data, commands, updates, and similar between the electrical sensor device 40 within the sensor assembly 10 and the receiver(s). Common examples of the wireless communication applicable useful in the automotive market segment and TPMS sensors include Bluetooth Low Energy (BLE) and low frequency (LF) radio frequency (RF). These communication methods are utilized for connection between sensors and receivers utilizing a plurality of antennas.

Referring back to FIG. 11, the sensor assembly and system as disclosed herein is capable of transmitting and receiving BLE 148 for communication with mobile devices 150 used by the vehicle driver, as well as RF for LF communication 144 and 145 with the vehicle ECU 146, which then relays information to the user dashboard. This dual communication system is preferred given the plurality of conditions which traditional vehicle computer systems are not equipped to receive. For example, traditional TPMS sensors relay conditions of temperature and pressure to the vehicle ECU which is communicated with the driver through signals on the dashboard to similar interface. However, most vehicles are not capable of receiving additional sensor conditions such as accelerometer data or cannot translate this data into meaningful information to display to the driver. This presents a barrier given the complexity of programming and fact that control of vehicle ECU development is generally held by the vehicle manufacturers. It is known that at some time, vehicle manufacturers will incorporate advanced tire information into the vehicle ECU and dashboard. However, this change will likely take years and will constantly be behind the technology. Therefore, sensor assemblies and systems as disclosed herein operate to address this limitation by incorporating a second form of communication for the sensing system such as BLE which is commonly utilized by other receivers such as smart phones, tablets, vehicle systems like CarPlay, etc., and through which data can easily be accessible with applications.

An alternative technique relying solely on one form of communication such as RF is to utilize a receiver which is programmed to collect and translate the information. This could be the vehicle ECU or a 3rd-party receiver which could be plugged into the cigarette lighter or USB connection for power, either of which would need to be adapted to translate the communication into meaningful information and fulfill the purpose of the sensor assembly and systems as disclosed herein. This receiver in turn could also transmit the information to one or more receivers utilizing the same form of communication or perhaps an alternative signal. For example, the sensor assembly may transmit through RF communication to a receiver, which then transmits information to a 2nd receiver using BLE communication or perhaps to a 2nd receiver over USB wired connection. There are any number of combinations that one skilled in the art can develop which would still fall within the scope of sensor assemblies and systems as disclosed herein. As indicated, in an example embodiment, the sensing system utilizes dual wireless communication protocols as such is advantageous until automotive manufacturers begin to incorporate functionality of translating the data from the sensor assembly into meaningful information from which drivers and the vehicle can rely.

Expanding on this variation of sensor assemblies and systems disclosed herein, sensing systems are also capable of replacing traditional TPMS devices. When setting up a traditional TPMS device, it is critical that the unique protocol of the particular vehicle is used to ensure proper communication between the sensor and vehicle. When the protocol is designated, the vehicle needs to be 'taught' to find the sensor(s) and assign the signal to a particular tire. The process is often complex and only performed by wheel and tire experts with specialized tools. To avoid the process of relearning sensors, one common technique is to clone the ID and or RF protocol of the original TPMS sensor and assign this to new sensor. Through the cloning process, the vehicle continues to identify the tire using the original unique ID of the sensor transmitted by the RF communication, typically 315 MHz or 433 MHz frequency. Many TPMS sensors even incorporate both signals and multiple protocols to reduce inventory and complexity.

As a direct replacement for traditional TPMS sensors, the sensor assemblies and systems as disclosed herein utilize the same industry standards and techniques for programming the sensor assembly for ECU communication. Therefore, the vehicle ECU is capable of receiving standard conditions such as temperature and pressure as designed by the OEM while the additional information is relayed to another receiver. However, it is the unique and preferred variation of sensor assemblies and systems as disclosed herein that the programming techniques typically reliant on RF communication from specialized receivers, can alternatively be performed over a secondary form of communication such as BLE from a mobile device. In an example embodiment utilizing dual communication, a vehicle owner can assign the designated protocol information during the vehicle selection process in a mobile application which would then be transmitted over BLE to the electrical sensor device 40 of the sensor assembly 10 which then programs the protocol and communicates over RF to the ECU. The mobile device can similarly be utilized to clone the unique ID of the original TPMS sensor, send the information of BLE to the electrical sensor device for programing and RF communication with the ECU. Through this method, sensor assemblies and systems as disclosed herein empower users to eliminates the need for expensive TPMS tooling and specialized training.

Beyond unique use of communication protocols, sensor assemblies as systems as disclosed herein provide a method through which critical wheel and tire conditions are evaluated, specifically critical safety and performance conditions like tire tread depth and alignment. Whereas conventional approaches demonstrate evaluation of tread depth and alignment conditions through the use of camera systems or measuring acoustics, the sensor assemblies and systems as disclosed herein evaluate these conditions utilizing raw sensor data from the electrical sensor device 40 of the sensor assembly 10.

To evaluate these conditions, using sensor assemblies and systems as disclosed herein, to rely accelerometer data and the technique of measuring the rotations per second (RPS) of a particular tire at a given speed to calculate the diameter of said tire. Using known manufacturing specifications for tire models, the diameter of said tire will indicate the tread depth and therefore health of the tire. It is an alternative technique to utilize gyroscopic data to calculate the diameter of the tire based on the path of the gyroscope and known position of the sensor assembly within the tire. Similarly, this data can be utilized to calculate camber and toe angle measurements to determine alignment variation.

It is known that the conditions of a vehicle tire are extreme and no two rotations of the tire are identical. Even in an environment where external factors like road conditions, temperature, moisture, etc., are controlled, the accelerometer and gyroscope data would vary due to pressure and temperature variations of the tire itself as well as always changing behavior of the rubber compounds. Therefore, the sensing system relies on complex filters and algorithms as well as multiple sample sets to perform tire diameter calculations and draw meaningful evaluation of tread depth and alignment conditions.

In an example embodiment, sensor assemblies and systems as disclosed herein activate the collection of accelerometer sample sets based on the speed of the vehicle. The speed of the vehicle is monitored using GPS speed and algorithms contained within a mobile device application, diminishing the burden of power consumption for the sensor assembly. Once the vehicle is determined to be traveling at a particular speed and maintains the speed for a particular period of time, the accelerometer sensor is activated via BLE signal and collects sample sets. The raw data is transmitted back to the mobile device over BLE and the application undergoes the complex process of filtering out 'noise' (such as the impact of the sensor assembly and tire against the road) and converting the raw data to tire RPS and diameter utilizing mathematical techniques such as the fast furrier transformation (FFT) algorithm. Once the diameter is calculated, the information is stored and the process is repeated, typically multiple times, and results are compared to ensure the integrity each individual sample set. Using known tread depth specifications for the particular tire along with repeated processing the aforementioned calculations, the tread depth of the tire is determined.

In another variation, sensor assemblies and systems as disclosed herein include a GPS device or an RFID chip that is used to transmit the location of the tire. This feature is of particular functionality for fleet organizations that experience vehicle and/or tire theft as well as for evaluation of inventory.

Another feature of sensor assemblies and systems as disclosed herein is the storage and accessibility of the advanced tire parameters available from the sensing system such as for telematics. An example embodiment would have the information collected by the sensor assembly communicated over BLE to a mobile device that is connected to the internet. The data can then be evaluated and information transmitted to a database such as the cloud. Over time, this database could be utilized for countless applications such as telematics, user-based insurance (UBI), regulatory (D.O.T.) and statistics, as well as by tire companies and automotive manufacturers to improve future products. In still another embodiment, the information transmitted by the sensor assembly is received by the ECU of an autonomous vehicle for adjustments to driving conditions and overall improvement of safety and performance.

The foregoing description and accompanying figures illustrate the principles, preferred embodiments and modes of operation of sensor assemblies and systems as disclosed herein. However, such sensor assemblies and systems should not be construed as being limited to the particular embodiments discussed above. Additional variations of the embodiments discussed above will be appreciated by those skilled in the art. Therefore, the above-described embodiments should be regarded as illustrative rather than restrictive. Accordingly, it should be appreciated that variations to those embodiments can be made by those skilled in the art without departing from the scope of the sensor assemblies and systems as defined by the following claims.

For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

In the detailed description herein, references to "in various embodiments," "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

What is claimed:

1. A sensor assembly configured for connection with a vulcanized rubber article, the sensor assembly comprising:
a housing comprising a structure having an internal cavity therein; and
an electrical sensor device that is disposed within the internal cavity and surrounded by a housing wall structure, wherein the housing comprises one or more surface features that are configured to contact the electrical sensor device to prevent movement of the electrical sensor device within the internal cavity, wherein the electrical sensor device is configured to sense, transmit and/or receive information regarding surrounding conditions, orientation and/or location when the sensor assembly is connected with a vulcanized rubber article.

2. The sensor assembly as recited in claim 1, wherein the housing comprises an outer surface that includes one or more display features or indicia that are viewable to a user when the sensor assembly housing is connected with the vulcanized rubber article.

3. The sensor assembly as recited in claim 1, wherein the housing comprises a top cover, the wall structure, and a base section that define the internal cavity, and wherein the top cover, wall structure and base section are each formed from materials that are the same or different from one another, and wherein one or more of the top cover, wall section, and base section is separate or integral with one another.

4. The sensor assembly as recited in claim 3, wherein one of the top cover or base section is removably attached with the wall structure to facilitate installation and/or removal of the electrical sensor device from the internal cavity.

5. The sensor assembly as recited in claim 1, wherein the internal cavity includes an unfilled open space inside the housing.

6. The sensor assembly as recited in claim 1, wherein the electrical sensor device is encapsulated by the inner cavity of the housing during a process of making the housing that operates to retain the position of the electrical sensor device within the housing.

7. The sensor assembly as recited in claim 1 further comprising a retaining member, wherein at least one of the housing and retaining member are configured to facilitate attachment of the housing with the retaining member.

8. The sensor assembly as recited in claim 7, wherein the housing comprises a wall structure that surrounds the internal cavity, and wherein the retaining member comprises a wall structure having an open chamber that is configured to accommodate the housing wall structure therein to provide attachment therewith.

9. The sensor assembly as recited in claim 1 further comprising a retaining member configured to attach with the housing, wherein the retaining member is formed from an elastomeric material that mitigates transmission of shock forces from the vulcanized rubber article to the housing when the retaining member is attached to the vulcanized rubber article and the housing is attached to the retaining member.

10. The sensor assembly as recited in claim 1, wherein the housing includes an opening extending from an outer surface of the housing to the internal cavity.

11. The sensor assembly as recited in claim 10, wherein the electrical sensor device comprises one or both of a storage element and a processor.

12. The sensor assembly as recited in claim 10, wherein the housing further comprises a filter that is positioned to filter air passing into the internal cavity before reaching the electrical sensor device.

13. A sensing system comprising the sensor assembly as recited in claim 1, wherein the sensing system comprises a receiver that is external from the vulcanized rubber article and that is configured to receive data from the electrical sensor device by wireless communication.

14. The sensing system as recited in claim 13, wherein the electrical sensor device comprises an accelerometer sensor connected therewith and is configured to send data from the accelerometer sensor wirelessly to the external receiver.

15. The sensing system as recited in claim 14, wherein the vulcanized rubber article is a vehicle tire and information from the accelerometer is used to determine one or more of tire alignment, tire orientation, road surface conditions surrounding the tire, traction, rotational speed of the tire at a given vehicle velocity, and tread depth of the tire.

16. The sensing system as recited in claim 13, wherein the sensor assembly comprises a RFID element.

17. The sensing system as recited in claim 13, wherein the electrical sensor device comprises a global positioning device.

18. The sensing system as recited in claim 17, wherein the vulcanized rubber article is a vehicle tire and a location of the vehicle tire is determined from information provided by the global positioning device.

19. The sensing system as recited in claim 13, wherein the electrical sensor device comprises a gyroscope.

20. The sensing system as recited in claim 19, wherein the vulcanized rubber article is a vehicle tire and information from the gyroscope is used to determine one or more of tire alignment, tire orientation, road conditions surrounding the tire, tire geometry, slip angle, and a tread depth of the tire.

21. The sensor assembly as recited in claim 1, wherein the electrical sensor device comprises:
a printed circuit board comprising electrical circuitry;
a portable power source for providing power to the electrical sensor device;
at least one sensor element; and
an antenna for receiving and/or transmitting information from the electrical sensor device.

22. The sensor assembly as recited in claim 21, wherein the electrical sensor device comprises one or more of an accelerometer sensor, a global positioning device, and a gyroscope.

23. The sensor assembly as recited in claim 21, wherein the sensor element is configured to sense one or more variables selected from the group consisting of air pressure, temperature, acceleration, tire information, wheel information, vehicle information, or orientation or location of the environment, the sensor assembly, or the vulcanized rubber article.

24. The sensor assembly as recited in claim 1 further comprising a retaining member configured to attach with the housing, wherein the vulcanized rubber article is a vehicle tire, and wherein the retaining member is configured for attachment with an inside surface of the vehicle tire.

25. The sensor assembly as recited in claim 24, wherein the retaining member is attached to the inside surface of the vehicle tire by an adhesive layer after the vehicle tire has been vulcanized.

26. A sensor assembly and sensing system for use with a vulcanized vehicle tire comprising:
a housing comprising an outer structure that defines an internal cavity therein,
an electrical sensor device disposed within the internal cavity, wherein the internal cavity includes an unfilled open space above or below the electrical sensor device inside the housing, wherein the electrical sensor device is configured to monitor and transmit and/or receive information regarding surrounding conditions, orientation and/or location, wherein the electrical sensor device comprises:
- a portable power source;
- a sensor; and
- an antenna for transmitting and/or receiving information relating to an operating parameter being monitored by the sensor;
- a retaining member configured for attaching with the vulcanized vehicle tire, wherein the retaining member is configured to accommodate attachment with the housing; and
- a receiver external from the vehicle tire that is configured to receive information from the electrical sensor device wirelessly.

27. The sensor assembly and sensing system as recited in claim 26, comprising an external transmitter for sending information wirelessly to the electrical sensor device.

28. The sensor assembly and sensing system as recited in claim 26, wherein the housing includes a wall structure having a top cover at a first axial end of the wall structure and a base section at an opposed second axial of the wall structure, wherein the retaining member has a wall structure and an open chamber defined therein that is configured to complement the housing wall structure to accept placement of the housing within the retaining member and attachment therewith.

29. The sensor assembly and sensing system as recited in claim 26, wherein one of the top cover or the bottom section are made separately from the wall section and are attached to the wall section after the electrical sensor device has been installed within the housing internal cavity.

30. The sensor assembly and sensing system as recited in claim 26, wherein the electrical sensor device is securely attached inside the internal cavity by surface features of the housing that are configured to connect with the electrical sensor device to fix placement of the electrical sensor device therein.

31. The sensor assembly and sensing system as recited in claim 26, wherein the retaining member is formed from an elastomeric material that mitigates transmission of shock forces received from the vehicle tire before reaching the housing attached with the retaining member.

32. The sensor assembly and sensing system as recited in claim 26, wherein the electrical sensor device comprises an accelerometer sensor and is configured to send data from the accelerometer sensor wirelessly to the external receiver.

33. The sensor assembly and sensing system as recited in claim 32, wherein the system is configured to use information from the accelerometer to determine one or more of tire alignment, tire orientation, road surface conditions surrounding the tire, traction, rotational speed of the tire at a given vehicle velocity, and tread depth of the tire.

34. The sensor assembly and sensing system as recited in claim 26, wherein the sensor assembly comprises a RFID element.

35. The sensor assembly and sensing system as recited in claim 26, wherein the electrical sensor device comprises a global positioning device.

36. The sensor assembly and sensing system as recited in claim 35, wherein the system is configured to determine a location of the vehicle tire from information provided by the global positioning device.

37. The sensor assembly and sensing system as recited in claim 26, wherein the electrical sensor device comprises a gyroscope.

38. The sensing system as recited in claim 37, wherein information from the gyroscope is used to determine one or more of tire alignment, tire orientation, road conditions surrounding the tire, tire geometry, slip angle, and tread depth of the vehicle tire.

39. The sensor assembly and sensing system as recited in claim 26, wherein the unfilled open space is above the electrical sensor device.

40. The sensor assembly and sensing system as recited in claim 26, wherein the unfilled open space is below the electrical sensor device.

41. The sensor assembly and sensing system as recited in claim 26, wherein the unfilled open space is above and below the electrical sensor device.

42. A method for using a pressure sensor assembly and sensing system with a vulcanized rubber article comprising the steps of:
- installing an electrical sensor device within an internal cavity of a housing, wherein the housing comprises an opening extending from an outer surface of the housing to the internal cavity, and wherein the electrical sensor device comprises a sensor, a portable power source, an antenna, a printed circuit board, and related electrical circuitry;
- attaching the housing after the step of installing to a retaining member, wherein the retaining member is configured to accommodate attachment with the housing, wherein the retaining member is attached with the vulcanized rubber article before or after formation of the vulcanized rubber article; and
- monitoring an operating parameter through the use of the electrical sensing device, wherein information related to the operating parameter is wirelessly transmitted from the electrical sensing device to a receiver that is external from the sensor assembly.

43. The method as recited in claim 42, wherein during the step of installing, the housing includes a wall structure having an opening through which the electrical sensor device is installed and, after the step of installing, the opening is closed by attaching a top cover or bottom section to the opening.

44. The method as recited in claim 42, wherein during the step of installing, one or more surface features of the housing inside the internal cavity are configured to connect with the electrical sensor device to fix placement of the electrical sensor device inside the housing within the internal cavity.

45. The method as recited in claim 42, wherein before the step of attaching, the retaining member is attached to the vulcanized rubber article after the vulcanized rubber article has been formed by an adhesive layer interposed between a surface of the vulcanized rubber article and the retaining member.

46. The method as recited in claim 42, wherein the retaining member is attached to the vulcanized rubber article after the step of attaching the housing to the retaining member.

47. The method as recited in claim 42, wherein the retaining member is attached to the vulcanized rubber article by applying pressure onto the retaining member once placed into contact with the surface of the vulcanized rubber article to cause the adhesive layer to form an attachment therebetween.

48. The method as recited in claim 42, wherein the vulcanized rubber article is a vehicle tire, and wherein the retaining member is attached to a surface that is inside of the vehicle tire.

49. The method as recited in claim 48, wherein the sensor assembly electrical sensor device comprises an accelerometer sensor.

50. The method as recited in claim 49, wherein during the step of monitoring at least one or more of tire alignment, tire orientation, road surface conditions surrounding the tire, traction, rotational speed of the tire at a given vehicle velocity, and tread depth of the tire is determined from information sent wirelessly from the sensor assembly.

51. The method as recited in claim 42, wherein during the step of attaching, the housing is positioned relative to the retaining member according to a display feature that is positioned on the housing.

52. The method as recited in claim 42, wherein during the step of monitoring, the sensor monitors operating parameters comprising one or more of operating conditions, orientation, and location and transmits by use of the antenna information related to the monitored operating parameter to the receiver, and wherein the electrical sensor device is configured to receive information transmitted from an external device to change one or more feature of the electrical sensor device.

53. The method as recited in claim 48, wherein the electrical sensor device comprises a global positioning device, and wherein the step of monitoring a location of the vehicle tire is determined from information provided by the global positioning device.

54. The method as recited in claim 48, wherein the electrical sensor device comprises a gyroscope.

55. The sensing system as recited in claim 54, wherein information from the gyroscope is used to determine one or more of tire alignment, tire orientation, road conditions surrounding the tire, tire geometry, slip angle, and tread depth of the vehicle tire.

56. A sensor assembly configured for connection with a vulcanized rubber article, the sensor assembly comprising:
  a housing comprising a structure having an internal cavity therein; and
  an electrical sensor device that is disposed within the internal cavity, wherein the housing comprises one or more surface features that are configured to contact the electrical sensor device to prevent movement of the electrical sensor device within the internal cavity, wherein the electrical sensor device is configured to sense, transmit and/or receive information regarding surrounding conditions, orientation and/or location when the sensor assembly is connected with a vulcanized rubber article, and wherein the internal cavity includes an unfilled open space inside the housing.

* * * * *